US012748600B2

(12) United States Patent
Dall et al.

(10) Patent No.: US 12,748,600 B2
(45) Date of Patent: Sep. 29, 2026

(54) INTERRUPT CONTROLLER, APPARATUS, INTERRUPT CONTROL METHOD AND COMPUTER-READABLE MEDIUM

(71) Applicant: Arm Limited, Cambridge (GB)

(72) Inventors: Christoffer Dall, Copenhagen (DK); Marc Zyngier, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/861,990

(22) PCT Filed: Mar. 28, 2023

(86) PCT No.: PCT/GB2023/050800
§ 371 (c)(1),
(2) Date: Oct. 31, 2024

(87) PCT Pub. No.: WO2023/214143
PCT Pub. Date: Nov. 9, 2023

(65) Prior Publication Data

US 2025/0284498 A1 Sep. 11, 2025

(30) Foreign Application Priority Data

May 5, 2022 (GB) ..................................... 2206577

(51) Int. Cl.
*G06F 9/38* (2018.01)
*G06F 9/50* (2006.01)

(52) U.S. Cl.
CPC .......... *G06F 9/3861* (2013.01); *G06F 9/5016* (2013.01)

(58) Field of Classification Search
CPC ............................ G06F 9/3861; G06F 9/4812
See application file for complete search history.

(56) References Cited

U.S. PATENT DOCUMENTS 5,765,195 A 6/1998 McDonald
2005/0210174 A1* 9/2005 Hofmann ................ G06F 13/24 710/263

(Continued)

OTHER PUBLICATIONS

International Search Report and Written Opinion for an International Application No. PCT/GB2023/050800, dated Jul. 17, 2023.

(Continued)

*Primary Examiner* — Michael J Metzger
(74) *Attorney, Agent, or Firm* — NIXON & VANDERHYE P.C.

(57) ABSTRACT

An interrupt controller controls signalling of a given interrupt having a given interrupt identifier to a target interrupt handling context, by controlling one or more memory write requests to be issued in accordance with a coherency protocol supported by a cache coherent interconnect, to maintain a set of memory-based interrupt tracking structures corresponding to the target interrupt handling context, including: a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

20 Claims, 10 Drawing Sheets

(56) References Cited

U.S. PATENT DOCUMENTS

| | | | | |
|---|---|---|---|---|
| 2007/0124523 | A1* | 5/2007 | Shimizu | G06F 13/24 710/260 |
| 2008/0091884 | A1 | 4/2008 | Piry et al. | |
| 2008/0191884 | A1 | 8/2008 | Garcia et al. | |
| 2008/0244570 | A1* | 10/2008 | Bohizic | G06F 9/45537 718/1 |
| 2013/0138850 | A1 | 5/2013 | Yamashita et al. | |

OTHER PUBLICATIONS

XP-002369272, “Processes,” Chapter 4.

* cited by examiner

INTERRUPT CONTROLLER, APPARATUS, INTERRUPT CONTROL METHOD AND COMPUTER-READABLE MEDIUM

The present technique relates to the field of interrupt control.

In a data processing system, an interrupt controller has the job of detecting interrupts raised by one or more interrupt sources and signalling the interrupts to a physical or virtual processor responsible for handling interrupt.

At least some examples provide an interrupt controller comprising: interrupt detection circuitry to detect interrupts raised by one or more interrupt sources; interrupt controller memory access circuitry to issue memory access requests for accessing a shared memory system via a cache coherent interconnect; and interrupt control circuitry responsive to a given interrupt with a given interrupt identifier being detected by the interrupt detection circuitry, to control signalling of the given interrupt to a target interrupt handling context by controlling the interrupt controller memory access circuitry to issue one or more memory write requests, in accordance with a coherency protocol supported by the cache coherent interconnect, to maintain a set of memory-based interrupt tracking structures corresponding to the target interrupt handling context, the set of memory-based interrupt tracking structures including: a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

At least some examples provide an apparatus comprising: the interrupt controller mentioned above; the cache coherent interconnect; and at least one physical processor, a given physical processor comprising: processing circuitry to perform data processing in response to instructions; at least one processor cache; and processor memory access circuitry to issue memory access requests for accessing the shared memory system via the cache coherent interconnect.

At least some examples provide an interrupt control method comprising: detecting interrupts raised by one or more interrupt sources; and in response to a given interrupt of a given interrupt identifier being detected, controlling signalling of the given interrupt to a target interrupt handling context, by controlling issuing of one or more memory write requests via a cache coherency interconnect in accordance with a coherency protocol, to maintain a set of memory-based interrupt tracking structures corresponding to the target interrupt handling context, the set of memory-based interrupt tracking structures including: a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

At least some examples provide a computer-readable storage medium to store computer-readable code for fabrication of an interrupt controller or apparatus as described above. The computer-readable medium may be a non-transitory storage medium.

Further aspects, features and advantages of the present technique will be apparent from the following description of examples, which is to be read in conjunction with the accompanying drawings, in which.

Figure 1:
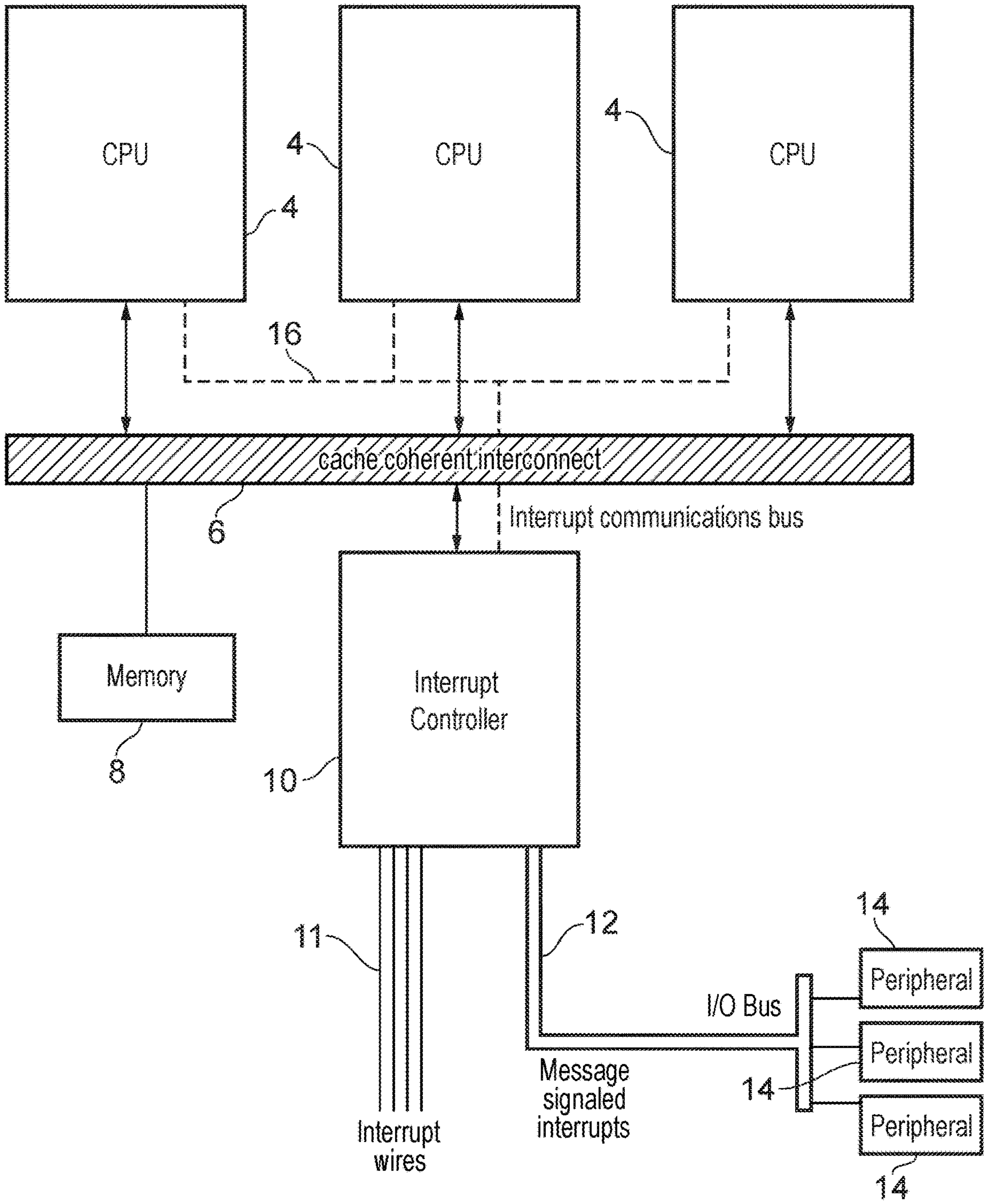
FIG. 1 illustrates an example system having an interrupt controller.

An interrupt controller communicates with one or more processors to which the interrupt controller forwards interrupts. One way to implement this communication is to use a dedicated interrupt bus using a dedicated communication protocol, specifically designed to carry interrupt signals from the interrupt controller to the processors. This bus and protocol may be separate from the bus and protocol used for memory system accesses. However, implementing a dedicated interrupt handling bus and protocol can require significant design effort, and can make it difficult to scale the interrupt bus and interrupt controller to handle varying numbers of processors and varying numbers of interrupts.

An interrupt controller discussed below comprises interrupt detection circuitry to detect interrupts raised by one or more interrupt sources; interrupt controller memory access circuitry to issue memory access requests for accessing a shared memory system via a cache coherent interconnect; and interrupt control circuitry responsive to a given interrupt with a given interrupt identifier being detected by the interrupt detection circuitry, to control signalling of the given interrupt to a target interrupt handling context by controlling the interrupt controller memory access circuitry to issue one or more memory write requests, in accordance with a coherency protocol supported by the cache coherent interconnect, to maintain a set of memory-based interrupt tracking structures corresponding to the target interrupt handling context. The set of memory-based interrupt tracking structures maintained by the interrupt controller in response to the given interrupt includes: a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

With this approach, the cache coherent interconnect (typically already provided for controlling access to shared memory by processors having one or more caches) can be reused to also distribute interrupt signals required to be processed by a given interrupt handling context. The cache coherent interconnect may support a coherency protocol which defines a set of coherency states, transaction types and rules for processing each transaction type, to control access to shared memory so that after one requester updates data for a given address, other requesters requesting the data for that address receive the latest value updated by the first requester and do not receive an old cached copy that is out of date after the update made by the first requester. Hence, interrupt tracking data structures can be stored in the shared memory system and have their coherency managed using the coherency protocol implemented by the cache coherent interconnect. This means that when the interrupt controller writes to a given address of the memory-based interrupt tracking structures, a processor which has cached data for that address can be informed by the cache coherent interconnect (e.g. by receiving a snoop request), and so can be prompted to perform an action for handling the interrupt represented by the update to the interrupt tracking structures. By using the cache coherent interconnect for forwarding interrupts to a processor which is to handle interrupts for a certain interrupt handling context, this avoids the need to provide a dedicated interrupt bus, and means that the interrupt controller can be much more easily scalable to different numbers of processors and different numbers of interrupts, since the scalability can be provided by scaling the number or size of interrupt tracking structures stored in the memory system rather than the physical circuit wiring.

The set of memory-based interrupt tracking structures for a given interrupt handling context includes at least: two or more interrupt queue structures each for queuing interrupts for processing by the given interrupt handling context, and a queue status summary structure to indicate which of the interrupt queue structures hold pending interrupts awaiting processing by the target interrupt handling context. The queue status summary structure provides an efficient way for a processor to monitor, on behalf of a certain interrupt handling context, whether there is any pending interrupt awaiting processing for that context, because the processor can monitor the address corresponding to the queue status summary structure for updates based on cache coherency messages (such as snoop messages) received from the cache coherent interconnect, which is much more efficient than alternative approaches which could, for example, monitor separate memory addresses for each different interrupt identifier or each different queue. The indirection provided by the queue status summary structure (with the processor able to monitor a summary of the queue status, rather than the queues themselves) therefore helps to reduce the number of addresses required to be monitored by the processor while still supporting the ability for the interrupt controller to deliver interrupts with a potentially large number of different interrupt identifiers. This is useful because to be able to monitor a given address, the processor may allocate a cache entry in its cache for the monitored address and this consumes cache capacity which could not otherwise be used for other data, hence reducing the effective cache capacity available for regular data. Hence, having to monitor a large number of different addresses for interrupt handling purposes could limit the performance achieved for software requiring access to other data in memory. By providing the queue status summary structure, multiple queues and interrupt identifiers can be monitored for pending interrupts based on monitoring of updates to a single address by the interrupt controller, greatly reducing the performance cost of monitoring for interrupts at the processor.

The interrupt detection circuitry of the interconnect controller may detect the incoming interrupts using different approaches. For example, interrupts could be asserted by interrupt sources over dedicated physical wiring (not used for memory read/write operations), and detected by the interrupt detection circuitry based on signals asserted on that physical wiring. Alternatively, some peripheral devices acting as interrupt sources may use message-signalled interrupts (MSI) to raise interrupts to the interrupt controller, where the interrupt source stores data to a particular address in memory monitored by the interrupt controller, to signal that the interrupt has been raised. The interrupt detection circuitry could support either one of these approaches alone, or could support both in combination (with some interrupts delivered via physical wires and others as message-signalled interrupts).

The interrupt control circuitry may control the interrupt controller memory access circuitry to issue memory write requests for maintaining two or more sets of the memory-based interrupt tracking data structures, each set corresponding to a respective interrupt handling context. Each interrupt handling context could be a respective physical processor (provided in hardware) or virtual processor (software executing on a physical processor to emulate behaviour of another processor). It is not necessary for the interrupt controller to actually be aware of which particular physical or virtual processor is handling the interrupts for a particular interrupt handling context. In some examples, the interrupt control circuitry may have access to interrupt handling context configuration data which specifies one or more base addresses for identifying addresses of the relevant set of memory-based interrupt tracking structures to use for a particular interrupt. For example, the interrupt handling context specifying data could be looked up based on parameters of an incoming interrupt (e.g. based on the interrupt identifier and/or a source identifier identifying the interrupt source from which the interrupt was received). The base addresses identified for a given interrupt can be used to identify which memory addresses to specify in the write requests for updating the relevant set of memory-based interrupt tracking data structures (e.g. the format of the structures may be predefined so that the offsets of particular parts of the interrupt tracking data structures relative to the base addresses is known). For different interrupts which are to be handled by different interrupt handling contexts, different sets of base addresses may be identified and therefore different sets of tracking data structures updated. A particular processor may monitor one or more addresses for the relevant set of tracking data structures for a particular interrupt handling context (either the interrupt handling context used for physical interrupts directed to that processor, or the interrupt handling context used for virtual interrupts for a virtual processor currently resident on that processor). Which addresses are monitored by a particular processor may be configured by the software executing on that processor. For example, a hypervisor may configure a physical processor executing a given virtual processor to monitor the relevant address of the queue status summary structure of the set of interrupt tracking structures used for the given virtual processor. However, the interrupt controller may be unaware of which particular interrupt handling context is updated by any one processor—the interrupt controller simply updates the relevant set of memory-based interrupt tracking data structures and does not need to perform any action to identify which physical processor or virtual processor is to process the interrupt.

The respective queue structures for a given interrupt handling context can be organised in different ways. In one example, each queue could correspond to a specific interrupt identifier or group of interrupt identifiers. The selection of the queue based on the interrupt identifier could be directly based on the interrupt identifier, or indirectly based on another parameter identified based on the interrupt identifier.

For example, that other parameter could be an interrupt priority level used to prioritise between interrupts. A higher priority interrupt may be processed before a lower priority interrupt. The interrupt queue structures for a given interrupt handling context can therefore be organised so that the queue structures correspond to respective interrupt priority levels, with the interrupts having equal priority allocated to the same interrupt queue structure. Hence, in response to the given interrupt, the interrupt control circuitry may determine a given priority level for the given interrupt based on the given interrupt identifier, and select, as the selected interrupt queue structure, one of the plurality of interrupt queue structures corresponding to the given priority level. This approach can make it much more straightforward for software executing on a processor to determine which interrupt queue structure to read next, as it can simply step through all the pending interrupts in a higher priority queue before switching to reading a lower priority queue, rather than needing to compare stored priority indications associated with interrupts queued within the same queue structure or in different queue structures.

The set of memory-based interrupt tracking data structures may comprise a number of interrupt status entries each corresponding to a respective interrupt identifier and specifying an interrupt priority level associated with that interrupt identifier. Hence, the priority level assigned to each interrupt identifier can be programmable by software setting the interrupt priority level specified in the relevant interrupt status entry for a given interrupt identifier.

Another property that may be desired to be specified for a particular interrupt identifier may be an enable/disable status indicating whether interrupts of the corresponding interrupt identifier should be enabled (so that a processor acts upon an interrupt of that interrupt identifier when signalled as pending by the interrupt controller) or disabled (so that the interrupt is masked and so even if signalled as pending, the processor does not respond to the interrupt). Whether a given interrupt identifier should have its interrupts enabled or disabled may be set by software executing on at least one processor, and so may not be directly set by the interrupt controller.

Hence, it can be useful for the set of memory-based interrupt tracking data structures to comprise a plurality of interrupt status entries each corresponding to a respective interrupt identifier and specifying whether interrupts of that interrupt identifier are currently enabled. These interrupt status entries can be the same entries which also specify the interrupt priority level as discussed above. Hence, when the interrupt controller receives an interrupt for a given interrupt identifier, it can check the corresponding interrupt status entry to determine whether the interrupt is enabled, and if so, update the selected interrupt queue structure and queue status summary to signal that a pending/enabled interrupt has been allocated to the selected interrupt queue structure. Hardware at the processor can then learn of the update via the coherency mechanisms supported by the cache coherent interconnect, and this can prompt a processor to raise an exception to cause software to service the interrupt.

The queue status summary structure can be implemented as a bitmap where each bit indicates whether a corresponding queue has at least one pending interrupt. This provides an efficient structure for identifying the status of a number of queues.

It can be useful for the queue status summary structure to have a size which fits within a single cache line. This allows monitoring of the queue status summary structure to be performed by a processor based on allocation of a single cache entry for the address of that queue status summary structure. In contrast, if the queue status summary structure was larger than one cache line, multiple cache entries would need to be allocated to ensure that the processor is informed by the cache coherent interconnect when any part of that structure is updated. Here, the term "cache line" refers to a block of memory address space which is of a certain size used as the granularity for coherency control in the coherency protocol supported by the cache coherent interconnect. For example, the coherency protocol could define coherency states (such as clean/dirty, shared/exclusive) at granularity of cache lines. A cache line may also be the basic unit of data transfer transferred in one operation between different levels of memory system hierarchy (e.g. different caches or memory storage units).

It can be also be useful for each interrupt queue structure to have a size which fits within a single page of address space. Here, the term "page" refers to the size of the unit of address space used for controlling memory management at the processor. By defining each interrupt queue structure to have a size no greater than the page size, this means that the interrupt queue structure can be guaranteed to be stored within a single continuous range of physical memory, which can help to avoid the need for the interrupt controller to support address translation, simplifying the interrupt controller design.

Similarly, it can be useful for the queue status summary structure and interrupt status entries mentioned above to fit within a structure which is no greater than a single page size. As the queue status summary structure may comprise a single cache line then this leaves space for the interrupt status entries to be stored at addresses within the same page as the status summary structure. Hence, in one example an interrupt descriptor structure, comprising the queue status summary structure and at least one item of further information, may have a size which fits within a single page of address space, with the at least one item of further information comprising at least the interrupt status entries each corresponding to a respective interrupt identifier, and indicating at least one of: an interrupt priority level, and an enable status associated with that interrupt identifier. In some examples, the interrupt descriptor structure may also include the queue enable control structure described below.

A given interrupt queue structure may comprise a queue descriptor specifying information about the given interrupt queue structure.

For example, the given interrupt queue structure may comprise a queue size parameter indicative of a maximum queue size for the given interrupt queue structure. This can be useful to support varying queue sizes so that there is flexibility to combine multiple interrupt queue structures into the same page address space if relatively few interrupts are expected for each queue.

In addition to the queue size parameter, or instead of the queue size parameter, the given interrupt queue structure may comprise at least one of: a write pointer indicative of a next queue entry to be updated by the interrupt controller, and a read pointer indicative of a next queue entry to be read for the target interrupt handling context. The write pointer and read pointer can be useful to identify the position in the queue reached by the interrupt controller when writing information for newly received interrupts raised by the interrupt sources, and the position in the queue reached by software executing on a given processor when servicing interrupts indicated as pending in the queue. The write/read pointers could be defined in different ways. For example, the write/read pointers could point to the last entry written/read and so be incremented before writing/reading the next entry, or could point to the next entry to be written/read and be incremented after writing/reading the next entry. Either way it allows the interrupt controller and processor (or software) to determine which entry is to be written/read next in the queue.

Other examples could indicate the queue size or the queue write/read pointers in a separate structure from the queue itself.

A given interrupt queue structure may comprise a lock parameter to indicate whether the given interrupt queue structure is locked for exclusive access. In response to the given interrupt, when the lock parameter for the selected interrupt queue structure indicates that the selected interrupt queue structure is locked for exclusive access, the interrupt control circuitry may defer updating the selected interrupt queue structure until the lock parameter indicates that the selected interrupt queue structure is no longer locked for exclusive access. This can be useful to avoid loss of synchronization which could otherwise arise when the contents of a given interrupt queue structure may be sought to be updated simultaneously by both the interrupt controller to write information for a newly raised interrupt and by software executing on a processor to clear information on a previously pending interrupt which has already been serviced. Both the interrupt controller and the software executing at one or more processors may use the lock parameter to determine whether the queue structure is currently unlocked for access before proceeding with writes to the queue structure, to ensure that the queue structure can be updated atomically to avoid incorrect settings of the queue caused by one of the interrupt controller and at least one processor reading the current state of the queue before an update made by another of the interrupt controller and at least one processor and then writing to the queue potentially overwriting or omitting the update made by the other of the interrupt controller and at least one processor, which could otherwise risk certain updates being missed (e.g. with a possible consequence being that a raised interrupt is incorrectly serviced twice or not serviced at all). Such errors can be avoided by using the lock parameter to negotiate access to the queue status structure when updated by multiple parties. The lock parameter can be set the locked state before starting updates of information in the queue status summary structure and cleared to the unlock state once those updates are done. It will be appreciated that the handling of the lock parameter at the processor end is performed by software and so is not an inherent feature of the processor hardware itself as there need be no hardware circuit logic at the processor which takes account of the lock parameter (although the software may use certain hardware-supported primitive operations, such as an atomic test-and-set operation which can be used to atomically claim the lock, those hardware-supported primitive operations may be generic architecturally-defined operations which could be used for any address in memory, and are not specific to the lock parameter of the queue structure). On the other hand, the interrupt controller may have hardware circuit logic to read the lock parameter and determine whether it can proceed with writes to the given interrupt queue structure based on the lock parameter.

Other implementations may use a different synchronization mechanism to implement exclusive access to the queue. For example, a transactional memory mechanism could be used to control access to a shared queue, avoiding the need to implement the lock parameter.

In some examples, the write requests issued by the interrupt controller memory access circuitry to update the memory-based interrupt tracking structures can be non-stashing write requests which may request updates to data in shared memory but which do not directly cause the updated value is to be allocated into the cache of the processor which is monitoring for updates of those tracking structures. Such non-stashing write requests may cause the cache coherent interconnect to snoop a cache of a processor which may prompt (directly or indirectly) the processor to issue a request to read back the data of the queue status summary structure to allow software on the processor to determine which queue structures hold pending interrupts.

However, some interconnect protocols may also support stashing requests which can be used by one memory system requester to cause updated data for a given address to be stashed directly in the cache of another memory system requester, without that other memory system requester having to request the data for that address explicitly. This can provide a faster way of transmitting updated data to a particular processor, because that processor is pushed the data without requesting it, rather than having to use a "pull" mechanism where the data is explicitly requested. This can be exploited by the interrupt controller when signalling interrupts to a processor. Hence, in response to the given interrupt, the interrupt control circuitry may control the interrupt controller memory access circuitry to maintain at least one cache line of the set of memory-based interrupt tracking data structures by issuing a cache stashing request to push an updated value for the at least one cache line to a cache associated with a processor handling interrupts for the target interrupt handling context. For example, the interrupt controller may store cache stashing configuration data specifying which processor's cache should receive such a cache stashing request when the interrupt controller updates the queue status summary structure for a given interrupt handling context. The cache stashing configuration data could be maintained by software executing on a processor. Hence, by using cache stashing requests, interrupt latency can be reduced by speeding up access to the updated value in the processor's cache by software responsible for checking the interrupt queue status summary structure for a given interrupt handling context.

In some use cases, the interrupt controller may be treated as a stand-alone product, separate from the processor to which the interrupt controller is forwarding interrupts and/or the cache coherent interconnect used to access the shared memory system. For example, a design for an interrupt controller may be licensed independently from a processor design or a design of the cache coherent interconnect. Therefore, it is not essential that a party responsible for the interrupt controller design also designs the components of the interconnect or processor.

However, in many cases the interrupt controller may be integrated into an apparatus together with the cache coherent interconnect and at least one physical processor, of which a given physical processor may comprise processing circuitry to perform data processing in response to instructions; at least one processor cache; and processor memory access circuitry to issue memory access requests for accessing the shared memory system via the cache coherent interconnect. For example, the apparatus may be a data processing system, e.g. a system on chip.

The given physical processor may comprise interrupt monitoring control circuitry to repeatedly control the processor memory access circuitry to issue an interrupt monitoring memory access request requesting that a given cache line designated for storing the queue status summary structure is brought into the at least one cache in an exclusive coherency state of the coherency protocol. By retaining the cache line corresponding to the queue status summary structure in the processor cache in an exclusive coherency state, this ensures that when the interrupt controller updates the queue status summary structure to indicate that there is a pending interrupt for a given key structure, the cache coherent interconnect will snoop the processor's cache to trigger invalidation of the data previously held in the exclusive coherency state, so that the processor may detect that the interrupt has been raised. As the snoop may trigger the invalidation of the data held for the address of the given cache line corresponding to the queue status summary structure, it can then be useful to request that the data for the given cache line is subsequently brought back into the cache and this may cause the latest data value set by the interrupt controller for that cache line to be provided to the given physical processor. Hence, it can be useful that the interrupt monitoring control circuitry repeatedly requests that the given cache line is brought into the at least one cache in the exclusive coherency state, to ensure that the line remains in the cache despite invalidations triggered by updates made by the interrupt controller, and that the updated value for the line is brought into the cache.

The repeated issuing of memory access requests requesting that a given cache line should be brought into the at least one cache of the processor can be controlled in different ways. One approach may be to periodically issue such request that regular intervals. However, it is not essential that the intervals between successive requests for the same cache line should be regular. Another approach can be that each time a snoop request from the cache coherent interconnect causes data for the address of the given cache line to be invalidated from the cache, the interrupt monitoring control circuitry may respond by issuing another interrupt monitoring memory access request, so that the data for that cache line can continue to be held in the cache in exclusive coherency state to allow for continued monitoring for updates by the processor. Hence, the timing of the repeated requests for the given cache line can vary depending on the implementation chosen.

The term "interrupt monitoring memory access request" is used to denote memory access requests issued by the processor memory access circuitry under control of the interrupt monitoring control circuitry, to request that the cache line designated for storing the queue status summary structure of a given set of interrupt tracking structures is brought into the cache. From the point of view of the cache coherent interconnect, it is not necessary that the interrupt monitoring memory access request is distinguished in any way from other types of memory access request issued by the processor for accessing data other than the interrupt tracking data structures. The cache coherent interconnect may be unaware of whether or not a particular request is accessing an interrupt tracking data structure.

There could be a relatively large number of different interrupt handling contexts which the processor could monitor for updates. However, in practice monitoring the addresses of the queue status summary structures for each context may be infeasible, especially in systems which support virtual processors where the number of interrupt handling context corresponding to each virtual processor may be extremely large. Hence, it is not necessary for the processor to be monitoring all interrupt handling context simultaneously.

In one example, it can be particularly useful for the interrupt monitoring control circuitry to control the processor memory access circuitry to issue the interrupt monitoring memory access requests for a plurality of cache lines comprising: at least one cache line designated for storing the queue status summary structure of the set of memory-based interrupt tracking data structures corresponding to the given physical processor; and when a given virtual processor is currently resident on the given physical processor, at least one cache line designated for storing the queue status summary structure of the set of memory-based interrupt tracking data structures corresponding to the given virtual processor. This allows both interrupts targeting the particular physical processor and virtual interrupts targeting a currently resident virtual processor to be monitored simultaneously. It is not essential to monitor more than one physical processor's interrupt handling context simultaneously, although that could also be useful for example to isolate interrupts handled in different security states of the physical processor. Similarly, it is not essential to monitor more than one virtual processor's interrupt handling context simultaneously, as only virtual interrupts targeting a currently resident virtual processor being executed by the physical processor would be able to be handled without hypervisor intervention to reschedule which virtual processor is executing. By limiting the number of monitored addresses to the addresses of the queue status summary structures for one physical interrupt handling context and one virtual interrupt handling context, the overhead in terms of cache capacity used up for interrupt monitoring which cannot be used for regular data can be reduced, hence improving performance. Hence, in some implementations, the interrupt monitoring memory access request may support monitoring of at least one address for a physical interrupt handling context and at least one address for a virtual interrupt handling context simultaneously. The specific addresses of the cache lines to be monitored for interrupt monitoring purposes may be defined by software using configuration data accessible to the interrupt monitoring control circuitry.

It can be useful for the cache coherent interconnect to apply a quality of service mechanism for regulating access to a shared resource in response to requests from the at least one physical processor and the interrupt controller, to prevent the interrupt controller being starved of access to the given cache line due to repeated requests from the at least one physical processor for the given cache line. In some implementations where the processor repeatedly issues interrupt monitoring memory access request for the same address, the frequency of accesses to that address issued by one or more processors may be higher than the frequency of accesses to that address made by the interrupt controller, which could risk starvation of access by the interrupt controller if swamped by the much greater volume of access requests by the processors. A quality of service mechanism may already be supported by many cache coherent interconnect designs, for example to limit the maximum bandwidth available to any one memory access request source, or provide guarantees of certain minimum bandwidth (e.g. guaranteed slots on a bus) available to certain memory access request sources. Any known quality of service mechanism may be implemented using the cache coherent interconnect and applied to the requests for access to an address mapped to the queue status summary structure.

In some examples, the set of memory-based interrupt tracking data structures also comprises a queue enable control structure to indicate which of the plurality of interrupt queue structures are disabled from causing an exception to be signalled to the processing circuitry. The responsibility for setting the queue enable control structure can lie with software. This can be useful to provide a control which allows software to quickly disable all interrupts of a given priority level from causing an exception to be signalled to the processing circuitry (without individually having to update each interrupt status entry for each interrupt identifier having that priority). This can allow software to mask an entire priority level, which can be useful for periods of execution where, for example, only one or more highest priority queues should generate an exception to the processing circuitry. The interrupt controller does not need to check or make use of the queue enable control structure. Instead, the interrupt controller may detect enable status for an individual interrupt based on the interrupt status entry associated with the corresponding interrupt identifier.

It can be useful for the queue status summary structure and queue enable control structure to be implemented as bitmaps where each bit indicates whether a corresponding queue has at least one pending interrupt (for the queue status summary structure) or has been disabled by software from causing an exception to be raised to the processing circuitry (for the queue enable control structure). The bits of the queue status summary structure and queue enable control structure corresponding to the same queue may be at the same relative position within the queue status summary structure and queue enable control structure respectively. This can allow the processor to combine the queue status summary structure and queue enable control structure using a logical operation (e.g. a bitwise AND operation, if the structures are encoded so that a bit value of 1 in the queue status summary structure indicates a queue with at least one pending interrupt and a bit value of 0 in the queue enable control structure indicates a queue for which exceptions to the processing circuitry are currently disabled), to produce a value indicating which queues both contain pending/enabled interrupts and are enabled for causing an exception to the processing circuitry. This enables some queues which do not contain any pending interrupts or which have been disabled by software from causing exceptions to be generated to the processing circuitry to be eliminated from causing an exception or being read for more detailed checks of which interrupts are pending.

Where the queue enable control structure is supported, it can be useful for the queue enable control structure to be provided within the same cache line as the queue status summary structure. This means that when the processor monitors for updates to the queue status summary structure made by the interrupt controller, any updated value received for the queue status summary structure will also cause the latest value for the queue enable control structure to be brought into the processor's cache, allowing the processor to use both structures to determine whether to signal an exception to the processing circuitry.

When respective sets of interrupt tracking data structures are provided corresponding to respective virtual processors (as the interrupt handling contexts for those interrupt tracking data structures), the number of different virtual processors supported may be extremely large and it may be infeasible to simultaneously monitor, using hardware at the processor, each respective set of interrupt tracking data structure. Nevertheless, it may be desirable that when the interrupt controller signals that an interrupt has been raised for a given virtual processor, if the given virtual processor is not currently resident on any physical processor, a hypervisor is prompted to switch which virtual processor is resident on a given physical processor so as to cause the virtual processor required to service interrupt to execute. One approach could be to expand the size of the cache its each processor to accommodate monitoring of a larger number of addresses for different queue status summary structures for the different sets of tracking data structures for each virtual processor, but this may be extremely inefficient and require significant design effort for modifying processor designs to support the larger cache.

A more efficient approach can be to provide a doorbell interrupt generating unit, separate from the at least one physical processor and the interrupt controller, comprising: at least one doorbell interrupt generating unit cache; doorbell interrupt generating unit memory access circuitry to issue memory access requests for accessing the shared memory system via the cache coherent interconnect; and virtual interrupt monitoring circuitry to monitor coherency traffic sent to the at least one doorbell interrupt generating unit cache to detect signalling of a given virtual interrupt based on the interrupt controller updating the queue status summary structure of the set of memory-based interrupt tracking data structures for a given virtual processor, and in response to detecting signalling of the given virtual interrupt, to signal a doorbell physical interrupt to a given physical processor.

The doorbell interrupt generating unit can monitor for updates to the queue status summary structures made by the interrupt controller, in a similar way to the processor as discussed above. However, as the doorbell interrupt generating unit is a dedicated unit intended for monitoring virtual interrupt tracking structures, the doorbell interrupt generating unit's cache may not be required for caching any other data used by software executing on a physical processor, and so has capacity for caching the addresses of a much larger number of queue status summary structures corresponding to a larger number of virtual processors than would be practical at the processor itself. Hence, the virtual interrupt monitoring circuitry is configured to monitor updates to the queue status summary structure for a greater number of sets of memory-based interrupt tracking data structures than are monitored by interrupt monitoring control circuitry of the given physical processor. The virtual interrupt monitoring circuitry of the doorbell interrupt generating unit can monitor coherency traffic sent by the interconnect, and if an update is detected to any of the monitored addresses of the queue status summary structures for respective virtual processors, then a corresponding doorbell physical interrupt is signalled to a given physical processor. The doorbell physical interrupt could be signalled either using a physical wire (as in a traditional interrupt distributing approach) or by updating the set of interrupt tracking data structures for a physical interrupt handling context in memory as discussed earlier. The doorbell interrupt generating unit could cause the doorbell physical interrupt be signalled either directly itself, or indirectly by requesting that the interrupt controller performs this signalling. The mapping between a given virtual interrupt handling context for which a virtual interrupt is asserted and the physical processor (or physical interrupt handling context) for which a doorbell physical interrupt is to be asserted can be defined using configuration information programmable by software which is accessible to the virtual interrupt monitoring circuitry (the configuration information may also specify the interrupt identifier to be used for the doorbell physical interrupt). By providing the doorbell interrupt generating unit, it becomes much more feasible to scale virtual interrupt distribution to a larger number of virtual processors while limiting the redesign effort at each physical processor.

Some specific examples will now be described with reference to the drawings. It will be appreciated that the claimed subject-matter is not limited to these particular examples.

FIG. 1 schematically illustrates an example of a data processing system 2 (e.g. a system on chip) comprising a number of processors 4 (e.g. central processing units, CPUs). In this example three processors 4 are shown, but it will be appreciated that the number of processors could vary. The processors communicate with each other and with shared memory 8 via a cache coherent interconnect 6 which supports a coherency protocol to maintain cache coherency of data cached in private caches of each processor 4.

An interrupt controller 10 is provided, to receive incoming interrupt signals from connected peripherals 14 and forward them to the processors 4. In some cases, processors also generate interrupts for other processors known as Inter-Processor Interrupts (IPIs), so the processors 4 themselves can also act as interrupt sources. Peripherals can signal interrupts to the interrupt controller 10 either via dedicated wires 11 or by reusing an existing I/O (input/output) mechanism 12 such as memory-mapped I/O write operations. The latter is typically known as message-signalled interrupts (MSIs). The job of the interrupt controller is to prioritize interrupts according to a configuration performed by software, to ensure that a higher priority interrupt is presented to processors in preference to lower priority interrupts. On modern multi-processor systems, with more than a single processor, the interrupt controller may also have to route interrupts to one or more specified processors and handle re-programming of the routing configuration without losing interrupt signals.

The interrupt controller therefore needs to be able to communicate with the processors to which it can forward interrupts. As shown in FIG. 1, one way to implement this is to use a dedicated communication protocol and interrupt communications bus 16 in the system, which is specifically designed to carry interrupt signals from the interrupt controller 10 to the processors 4. The interrupt communications bus 16 is entirely separate from the cache coherent interconnect 6 used to convey memory transactions between the processors 4, memory 8 and interrupt controller 10 (the interrupt controller 10 may still have an interface to the cache coherent interconnect 6 to allow memory transactions issued by the processors 4 to program the configuration information which controls how the interrupt controller 10 handles forwarding of interrupts to the processors 4). However, providing a dedicated interrupt communications bus 16 and protocol can require significant design effort especially in large distributed systems and for multi-socket implementations.

Also, another function of the interrupt controller 10 is holding the configuration (e.g. priority and target processor) for different interrupts and the state of an interrupt (enabled, masked, pending), which traditionally is done in dedicated storage (e.g. registers) within the interrupt controller, but as the size of systems grow and the number of required interrupts increases, this becomes hard to scale with the required number of processors and interrupts.

Figure 2:
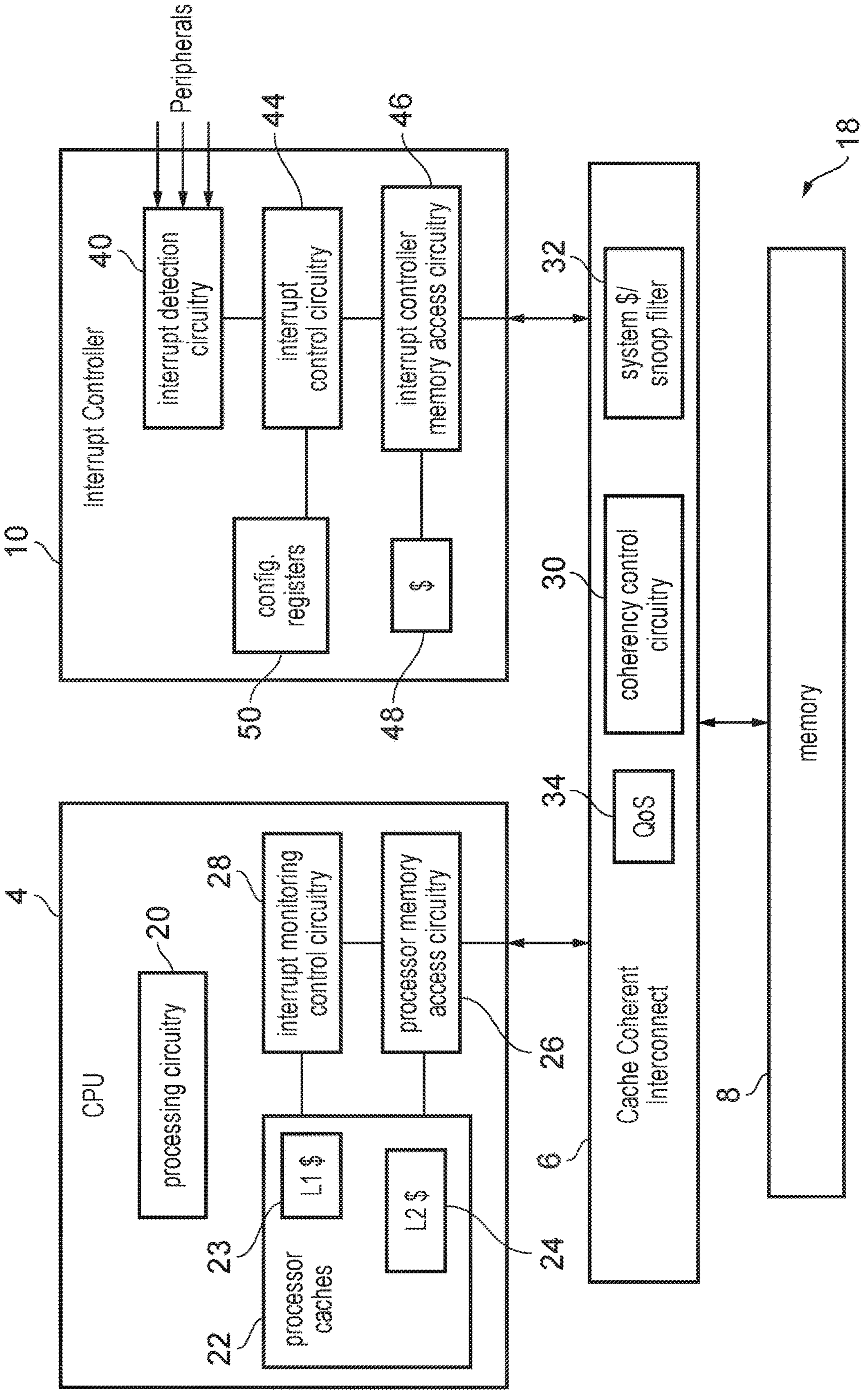
FIG. 2 illustrates a data processing system having an interrupt controller which distributes interrupts to a target interrupt handling context by updating interrupt handling tracking structures stored in coherent shared memory.
Figure 3:
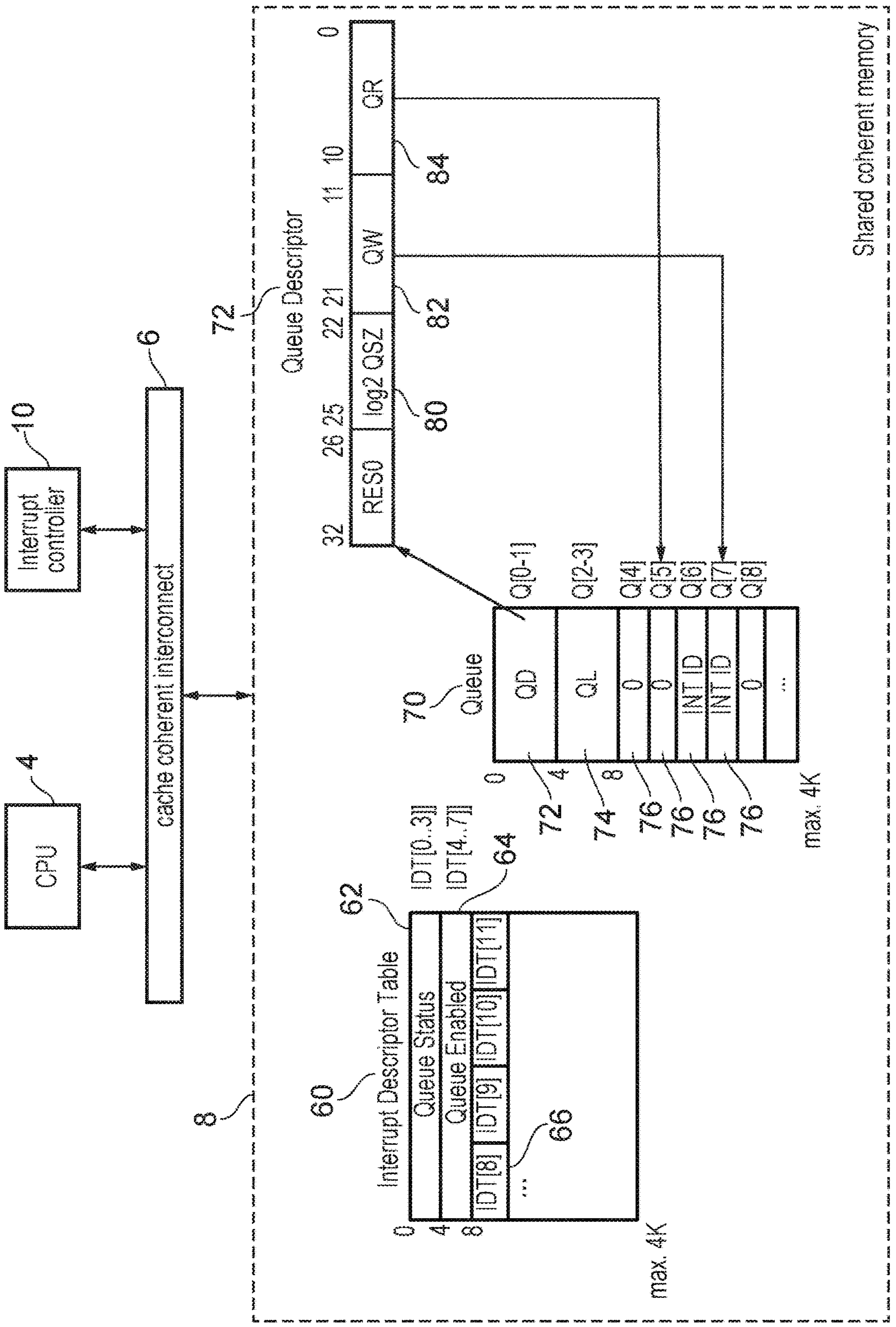
FIG. 3 illustrates an example of the interrupt handling tracking structures.

FIGS. 2 and 3 show a different approach, where the existing cache coherency mechanism supported by the cache coherent interconnect 6 is leveraged for distribution of interrupts from the interrupt controller 10 to the processor 4, and the interrupt configuration and state are represented by memory-based tables which are shared by the processors and the interrupt controller. By storing the interrupt tracking data structures in memory and using the cache coherency protocol of the cache coherent interconnect 6 to ensure consistency between the view of the shared tracking data structures seen by the interrupt controller 10 and the processors 4, this means that when an interrupt changes state as a result of a message or signal received by the interrupt controller 10, then the interrupt controller can cause the interrupt to be delivered to the correct processor by simply updating the tracking data structures stored in memory. This can be done without the need of a dedicated interrupt bus 16 by using the existing cache coherency interconnect mechanisms supported by the interconnect 6. This greatly reduces the design effort involved in scaling the chip design to different numbers of processors and interrupts, since the scaling can be implemented by changing the size or number of structures of the data stored in memory, rather than needing to expand the wiring of a dedicated interrupt distribution bus 16.

Hence, FIG. 2 illustrates an example of a data processing system 18 according to the present technique. As in FIG. 1, the system 18 includes at least one processor 4, the interrupt controller 10, the cache coherent interconnect 6 and the memory 8. While FIG. 2 shows only a single processor 4 for conciseness, additional processors may be provided and may operate in the same way as the processor 4 shown in FIG. 2.

A given processor 4 includes processing circuitry 20 for performing data processing operations in response to instructions. For example, the processing circuitry 20 may include a processing pipeline with pipeline stages for fetching, decoding, and executing instructions. Any known pipeline design may be used for the processor 4. The processor 4 also includes a number of processor caches 22, which may include multiple levels of cache such as a level 1 cache 23 and a level 2 cache 24. Processor memory access circuitry 26 acts as the interface between the processor 4 and the cache coherent interconnect 6 and is responsible for issuing memory access requests and receiving responses to memory access requests, as well as receiving/issuing other messages according to the coherency protocol operated by the cache coherent interconnect 6, such as snoop requests and responses. When a load/store instruction executed by the processing circuitry 20 misses in the processor caches then this may trigger the processor memory access circuitry 26 to issue a read or write request to the cache coherent interconnect 6.

The interconnect 6 includes coherency control circuitry 30 which is responsible for determining how to process incoming requests received from the processor 4, interrupt controller 10 and other requesting nodes which act as sources of memory access transactions, and for routing corresponding requests to the memory 8. When the interconnect 6 receives a memory access request from one requesting node for an address whose data could potentially be cached at another requesting node, the interconnect 6 may send snoop requests to one or more requesting nodes to check coherency state of the data cached at that requesting node (e.g. whether the data is invalid (not cached), clean or dirty, shared or exclusive) and trigger an action, such as invalidating cached copies of data which will be out of date when another requester writes to the same address, or returning the latest dirty copy of the data to the original requester which requested access to the data. Any known coherency protocol can be used by the interconnect 6. Examples of coherency protocols which could be used are the AMBA® 4 ACE and AMBA® 5 CHI coherency protocols provided by ARM® Ltd of Cambridge, UK, but it will be appreciated that the techniques discussed herein could also be applied to systems using other coherency protocols.

The interconnect 6 may include a system cache 32 which can provide shared caching capacity accessible to all of the requesting nodes 4, 10 which have access to the memory 8. The shared system cache 32 provides faster access to cached data than would be possible with access to main memory 8 itself. The system cache 32 may also act as a snoop filter for (at least partially) tracking which data addresses are cached in caches 22, 48 at requester devices 4, 10. The snoop filter 32 can be used to reduce snoop traffic by allowing the coherent interconnect 6 to determine when data is not cached at a particular requester so that a snoop to that requester can be omitted. The snoop filter 32 is not essential, and some embodiments may provide an interconnect 6 which does not attempt to track the data cached at each requester. In this case, when one requester 4, 10 issues a read or write transaction to data which could be shared with other requesters, the coherent interconnect 6 may trigger snoop transactions to be issued to each other requester which could have a cached copy of the data from the same address, and manage changes in coherency state at those other requesters and/or responses to the requesting requester with more up to date versions of the data as necessary. However, if there are a lot of requesters, then this approach of broadcasting snoops to all cached requesters can be complex and result in a large volume of coherency traffic being exchanged within the system 18. By providing a snoop filter 32 which can at least partially track which addresses are cached at the respective requesters, this can help to reduce the volume of snoop traffic. In some cases the snoop filter 32 may precisely track the data stored in each requester's cache, so that the coherent interconnect 6 can determine exactly which data is cached where. Hence, when a transaction is received from an initiating requester directed to potentially shareable data then the interconnect 6 can determine from the content of the snoop filter 32 which other requesters are caching data from the same address and send snoop transactions to those requesters indicated in the snoop filter, avoiding the need to send snoops to other requesters which are not currently storing the data. However, other snoop filters may not track the content of the caches precisely. For example, a filter scheme may be used which ensures that the snoop filter 32 avoids false negatives, ensuring that any data which is present in private caches is logged as present in the snoop filter, but which permits some false positives, so that sometimes the snoop filter 32 may indicate that data is cached in a given requester, but actually the requester has already invalidated the data. This approach of allowing some imprecision can reduce the overhead of updating the snoop filter as it means that not every invalidation from the requester's cache has to be reflected at the snoop filter.

The interconnect 6 implements a quality of service (QoS) mechanism 34 which can be used to regulate the memory system bandwidth available for different sources of memory access transactions. The QoS mechanism 34 may set limits on the maximum bandwidth available to any one source or may guarantee at least a minimum bandwidth for a given source of memory access transactions, to prevent any one source of memory transactions being starved of access even if there is another source which is generating transactions at a much higher rate. Any known QoS scheme can be used.

Hence, the coherency protocol implemented by the interconnect 6 ensures that when two different requesters, such as a processor 4 and the interrupt controller 10, share access to shared data, updates made by one requester to the shared data will be seen by the other requester. In particular, if a first requester 4, 10 has data for a given address cached in its cache in an "exclusive" coherency state, then if a second requester issues a write request for the given address, this will cause the exclusively held data in the first requesters cached to be invalidated or updated based on a snoop request sent by the interconnect 6 in response to detecting the write request from the second requester. This can be exploited by the interrupt controller 10 to allow it to distribute interrupt signals to processors 4.

The interrupt controller 10 includes interrupt detection circuitry 40 to detect interrupts raised by interrupt sources such as processors 4 or peripherals 14 (although not shown explicitly in FIG. 2, as in FIG. 1 the interrupts could be detected using dedicated interrupt wiring 11 or with a message based approach where interrupts are signalled in-band in the memory transactions sent by peripheral devices for accessing the memory system 8). Interrupt control circuitry 44 responds to the detection of a given interrupt by the interrupt detection circuitry 40 to control handling of the interrupt and distribution of the interrupt to a processor 4. Interrupts controller memory access circuitry 46 is provided to control access to the memory system for the interrupt controller 10 and to manage the exchange of cache coherency messages between the interrupt controller 10 and the cache coherent interconnect 6. The interrupt controller 10 includes at least one cache 48 for caching data from certain addresses, and a set of configuration registers 50 which may be configured by software executing on a processor 4 to store configuration information which controls how the interrupt controller 10 handles the distribution of interrupts (alternatively, rather than providing dedicated configuration registers 50, the configuration information could be stored in memory-based structures stored in the memory 8, and potentially cached in the cache 48 of the interrupt controller 10).

When the interrupt control circuitry 44 determines that a given interrupt should be signalled to a given processor, this is done by controlling the interrupt controller memory access circuitry 46 to issue one or more memory write requests to update a set of memory-based interrupt tracking structures corresponding to the target interrupt handling context in which the interrupt is to be processed. These tracking structures will be discussed in more detail with respect to FIG. 3. Each interrupt handling context could be either a physical processor 4 implemented in hardware within the system, or a virtual processor which is software executing on a physical processor 4 to emulate the behaviour of a different processor. At any one time, a given physical processor 4 may be executing one active virtual processor (referred to as the "resident" virtual processor) but there may also be a number of inactive virtual processors which are awaiting slot of execution on a physical processor (these inactive virtual processors may be referred to as "non-resident" virtual processors). Each interrupt handling context has a corresponding set of memory-based interrupt tracking structures and the configuration registers 50 (or other configuration data structures stored in memory 8) can be used by the interrupt controller 10 to identify for a given interrupt which set of interrupt tracking structures to update (e.g. the configuration data may specify a mapping between an interrupt identifier or interrupt source of an incoming interrupt and the base addresses of the relevant interrupt tracking structures to be updated when that interrupt is detected).

The interrupt monitoring control circuitry 28 of the processor 4 is configured by software to monitor for updates to a certain set of addresses allocated for interrupt monitoring purposes. The addresses to monitor are set by the software. These addresses may include addresses of certain locations within one or more sets of interrupts tracking data structures used for one or more interrupt handling contexts for which interrupts are currently to be monitored. For example, at a given time the physical processor 4 may have the ability to simultaneously monitor a given address in the interrupt tracking data structures for the interrupt handling contexts corresponding to at least the physical processor 4 and the resident virtual processor running on the physical processor 4. Optionally, the physical processor 4 can also monitor further addresses for other interrupt handling contexts.

For each monitored address, the interrupt monitoring control circuitry 28 ensures that the data for that address is held in the processor caches 22 in the exclusive coherency state, so that the cache coherency protocol will cause an update to one of those addresses made by the interrupt controller 10 to trigger the interconnect 6 to deliver a snoop (or other message, such as a cache stashing request as discussed further below) to the processor 4. This message can trigger invalidation or updating of the exclusively held data, which can be detected and hence prompts the interrupt monitoring control circuitry 28 to deliver an interrupt exception to the processing circuitry 20 to cause software on the processing circuitry 20 to handle the interrupt. There can be a number of ways in which the interrupt monitoring control circuitry 28 can ensure that the data for the monitored addresses is continually held in the exclusive coherency state. One approach could simply be to repeatedly, at intervals of a certain time, issue a read request requesting exclusive access to the data, which if the data is already held in the cache will not prompt any request to the interconnect 6 but if the data has been evicted from the cache may cause the data to be read loaded into the cache in the exclusive state. Another approach could be that the read requests requesting exclusive access to the data are sent in response to detecting that the data for a monitored address has been evicted from the processor caches 22, either due to a replacement made due to cache capacity conflict when another address needs to be allocated to the cache, or due to a snoop from the interconnect 6. Regardless of which approach is taken for implementing the repetition of the request for exclusive access to the monitored address, by repeatedly requesting the data for the monitored address, this ensures that the snoop filter 32 is updated to track that the processor 4 holds the data for that address, so as to cause any update to that address by other requesters (such as the interrupt controller 10) to cause a snoop which can be used to prompt an interrupt handling exception.

FIG. 3 illustrates in more detail an example of a set of interrupt tracking data structures maintained as data stored in memory 8 for a given interrupt handling context. FIG. 3 shows the structures for a single interrupt handling context but it will be appreciated that these structures may be provided separately for each different interrupt handling context (e.g. physical processor or virtual processor). As shown in FIG. 3, the interrupt tracking data structures for a given interrupt handling context include an interrupt descriptor table 60 and a number of interrupt queue structures 70 (of which only a single queue 70 is shown in FIG. 3 for conciseness, but it will be appreciated that multiple queues 70 are provided within the set of interrupt tracking data structures for a given interrupt handling context, with each queue 72 for queuing a different group of interrupts).

The interrupt descriptor table 60 includes a queue status summary structure 62, a queue enable control structure 64, and a number of interrupt status entries 66, each interrupt status entry 66 corresponding to a respective interrupt identifier. Interrupts received by the interrupt controller 10 from interrupt sources each specify the interrupt identifier of that interrupt (or alternatively, specify an untranslated interrupt identifier specified by the interrupt source, which can be translated into a translated interrupt identifier by the interrupt controller 10 based on an interrupt translation table defining mappings between the untranslated interrupt identifier and translated interrupt identifier—this is described further below). The interrupt identifier is simply a value which distinguishes different interrupts from one another—different systems may use the identifiers in different ways and the interrupt controller 10 may be unaware of what is signified by the interrupt having a particular interrupt identifier. For example, different interrupt identifiers could be allocated for interrupts received from different interrupt sources, or for different types of interrupts, or for interrupts caused by different events. The particular way in which the interrupt identifiers are used may depend on the particular system configuration. The particular response to be taken when an interrupt of a given interrupt identifier occurs may be defined in the software installed on the processing apparatus, so is not predefined in hardware. Hence, the interrupt controller's actions may be generic and do not need to account for the specific meaning of any individual interrupt.

Each interrupt status entry 66 provides information about interrupts having the corresponding interrupt identifier, including information specifying the priority level assigned to that interrupt identifier (used for prioritisation between different interrupts) and an enable status indicating whether interrupts having the corresponding interrupt identifier are currently enabled or disabled (masked). Masked interrupts would not currently be required to be processed by a processor 4. Both the priority level and the enable state for a given interrupt identifier are configurable by software executing on the processor 4 by writing to the relevant interrupt status entry 66 for the corresponding interrupt identifier. Write access permissions for the addresses at which the interrupts status entries are stored may be defined in page table structures used by the processor 44 address translation, and used to enforce limits on which software is allowed to write the interrupt descriptor table 60.

The queue structures 70 are organised based on the priority level of interrupts, so that each queue structure 70 (within the set of tracking structures for a particular interrupt handling context) corresponds to interrupts of a different priority level. Hence, when an incoming interrupt is detected by the interrupt detection circuitry 40 of the interrupt controller 10, the interrupt control circuitry 44 checks the interrupt status entry 66 corresponding to the interrupt identifier specified by the incoming interrupt, and if the interrupt status entry 66 indicates that the interrupt is enabled, updates the corresponding queue 70 that is associated with the priority level specified in the interrupt status entry 66, to indicate that the interrupt is pending (currently disabled interrupts masked out by setting the disabled state in the interrupt status entry 66 would not cause a pending interrupt to be recorded in the corresponding queue 70). The address of the relevant queue 70 can be determined based on base addresses specified in the configuration information 50 for the interrupt controller 10.

Each queue 70 includes a queue descriptor (QD) 72, a queue lock parameter (QL) 74 and a number of interrupt queueing entries 76. The queue descriptor 72 provides information about the queue to allow the interrupt controller 10 and the processor 4 to manage access the queue. For example, the queue descriptor 72 may include a queue size indication 80 which may be used to identify limits on the size of the queue 70. The size indication 80 is not essential, and in the absence of the queue size indication each queue could be assumed to have a certain default size. However, by providing the size indication 80, this provides flexibility for queues for some levels of priority to be smaller than others to allow multiple queues to fit into a smaller space than if all queues 70 have the same size sufficient to handle interrupt priority levels expected to have a greater number of pending interrupts. The queue descriptor 72 also includes a write pointer (QW) 82 used to identify the next entry 76 to be written by the interrupt controller 10 when a new interrupt is to be added to the queue, and a read pointer (QR) 84 used by software executing on a processor 4 to identify the next entry 76 to be read by the software to obtain information about the next interrupt to be processed in the queue.

The queue lock parameter 74 is used to provide a shared memory protocol which enables ordering requirements to be enforced when the queue 70 needs to be manipulated from both the interrupt controller 10 and the processor 4 at the same time. The lock parameter 74 is settable to a locked state or an unlocked state. For example, the locked state could be indicated by 1 and the unlocked state could be indicated by 0. Alternatively, the lock parameter could be set to an identifier of the requester/software who holds the lock and so the lock parameter could be viewed, by a given requester, as being in the locked state (indicating that the queue is locked by another requester/software) when the lock parameter has a value other than the requester's own identifier. It will be appreciated that there are a variety of ways in which the lock parameter could be implemented. When either the interrupt controller 10 needs to update a given queue structure 70 to queue an additional interrupt for processing, or the software on the processor 4 needs to update the queue to clear information about an interrupt which has been serviced, the interrupt controller 10 or the software on the processor 4 first reads the lock parameter 70 for that queue to determine whether the lock parameter is in the locked state. If the lock parameter is in the locked state, then the interrupt controller 10 or software defers writing to the queue until the lock parameter is found to be unlocked, and once the lock parameter 74 is in the unlocked state then the interrupt controller 10 or software can claim the lock by updating the lock parameter to be in the locked state and then proceed with writing to the relevant entries 76 of the queue 70, before unlocking the lock parameter when writes are complete. This approach can ensure consistency of the queue 70 and avoid race conditions and loss of synchronization which could otherwise arise in the absence of a memory sharing protocol used by the interrupt controller 10 and the software at the processor 4. It will be appreciated that a locking mechanism is not the only way of ensuring synchronisation of shared memory and other approaches such as use of transactional memory could be used.

Each queue entry 76 of the queue 70 is either invalid (not providing information about any pending interrupt), or if valid provides information about pending interrupts, such as indicating the interrupt identifier of the corresponding interrupt. Optionally other information about the interrupt could also be recorded in the queue.

Returning to the interrupt descriptor table 60, the queue status summary structure 62 and the queue enable control structure 64 provide information about the set of queues 70 in the corresponding set of interrupt tracking data structures, which help make it faster for a given processor 4 to determine whether to signal an exception to the processing circuitry 20 to interrupt processing being performed by the processing circuitry. The queue status summary 62 is a bitmap where each bit of the queue status summary 62 corresponds to a respective one of the queues 70 and indicates whether that queue has any pending and enabled interrupts queued in the queue. When the interrupt controller 10 assigns a new pending interrupt to a queue 70 then it also sets the corresponding bit of the queue status summary 62 (it is not necessary for the interrupt controller 10 to first detect whether that bit is already set—it can be quicker just to write to the bit regardless of whether it was already set or was clear). The queue enable control structure 64 is a bitmap used by software to mask out interrupts of a given level of priority. Each bit of the queue enable control structure 64 corresponds to a respective one of the queues 70 and indicates whether that queue is enabled or disabled from causing an exception to be signalled to the processing circuitry when there is a pending/enabled interrupt allocated to the queue by the interrupt controller 10. Responsibility for maintaining the queue enable control structure 64 lies with the software on the processor 4 which is responsible for selecting which priority levels (queues) are currently enabled or disabled. The interrupt controller 10 itself does not need to read or write the queue enable control structure 64.

The queue status summary 62 indicating the pending status for each queue 70 and the queue enable control structure 64 indicating whether software has disabled exceptions for the corresponding queue 70 are organised in a corresponding way so that the bits corresponding to a given queue 70 are at the same bit position in both the queue status summary 62 and the queue enable control structure 64. For the queue status summary 62, a bit value of 1 indicates that the corresponding queue has at least one pending/enabled interrupt, and 0 indicates that the corresponding queue has no interrupts pending. For the queue enable control structure 64, a bit value of 1 indicates that the queue is enabled for causing an exception to be signalled when there is at least one pending/enabled interrupt in the queue, and a bit value of 0 indicates that the corresponding queue is disabled from causing an exception to be signalled to the processing circuitry 20, even if there was at least one pending/enabled interrupt recorded in the queue. This means that when the processor 4 needs to check whether an exception should be signalled to the processing circuitry 20 after receiving a snoop request indicating that an update to the address of the queue status summary 62 has been made (e.g. by the interrupt controller 10 or by software executing on another CPU updating the queue enable control structure 64), the queue status summary 62 and queue enable control structure 64 can be combined in a bitwise AND operation, so that if any bits are set to 1 in the AND result, the interrupt monitoring control circuitry 28 signals the exception to the processing circuitry 20, as this means there is at least one enabled queue which contains a pending/enabled interrupt. The AND result could also be used by software to determine, in response to that exception, which queues should be read for more detailed analysis of the queue contents. It will be appreciated that other examples could use a different mapping of what is indicated by bits of 0 or 1 in the status/enabled bitmaps 62, 64, in which case a different Boolean function (other than AND) can be used to combine the bitmaps to determine whether to signal an exception. Also, some implementations may not support the queue enable control structure 64 at all—the queue enable control structure 64 is optional.

In this example, the queue status summary 62 and queue enable control structure 64 are sized so that together they fit within one cache line, so that updates to the queue status summary 62 and queue enable control structure 64 can be monitored by a processor 4 by allocating a cache entry in its processor cache 22 for a single address to be monitored (since the cache line is the unit of granularity at which the interconnect 6 controls cache coherency). Hence, the processor is able to monitor for updates to multiple queues by monitoring only a single address cached as exclusive in its processor cache 22, which limits the performance cost of monitoring for interrupts compared to an approach which would allocate separate memory addresses to be monitored for each interrupt type or each queue.

In this example, the queue status summary 62 and queue enable control structure 64 are stored at interrupt status entry positions 0 to 3 and 4 to 7 respectively, so that interrupt identifiers 0 to 7 are invalid and valid interrupt identifiers have values of 8 or greater. Other examples could store the queue status/enable bitmaps 62, 64 separately from the interrupt status entries 66 and in that case there is no need to reserve any interrupt identifier values as invalid.

In this example, each queue structure 70 has a maximum size of 4 KB so that it fits within a single page of the address space used by the processor 4 as granularity of controlling address translation and memory access permissions using page tables. The size parameter 80 can optionally be used to limit the size of a queue structure 70 to less than 4 KB, which can allow multiple queues 70 to be allocated to the same page. Similarly, the interrupt descriptor table 60 has a maximum size of a single page. This avoids any risk of accesses to different entries within the same queue 70, or accesses to different entries within the interrupt descriptor table 60, having different behaviours due to being mapped to different page table entries, and ensures that both the interrupt descriptor table and each individual queue 70 is mapped to a contiguous block of physical memory so that address translation is not required at the interrupt controller.

It will be appreciated that while FIG. 3 shows one particular layout for the set of interrupt tracking structures for a given interrupt handling context, the same information could be laid out in a different arrangement in other examples.

Figure 4:
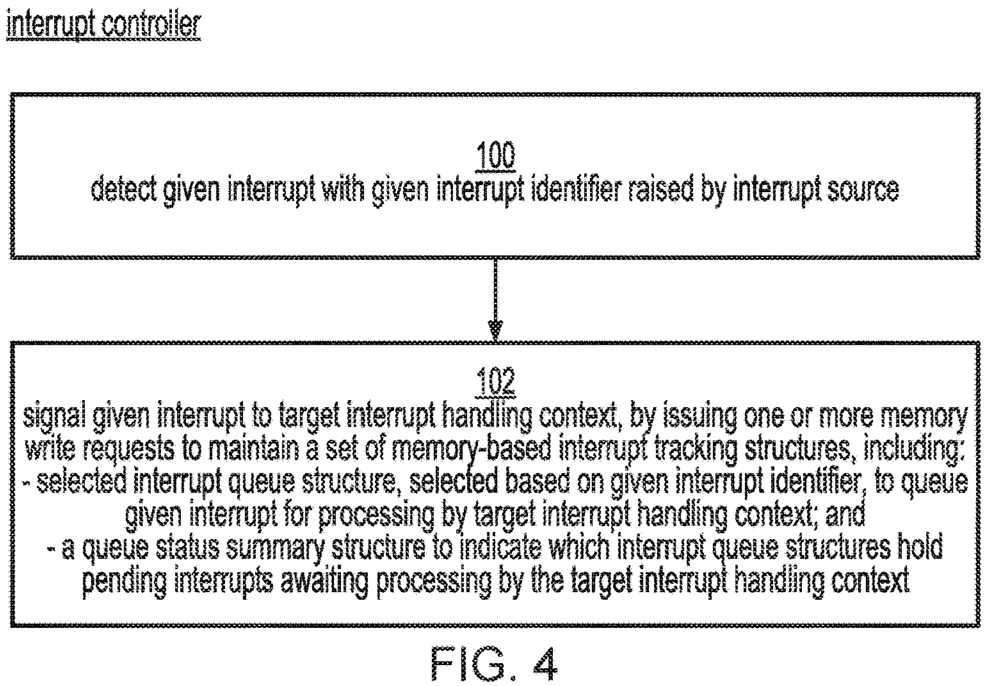
FIG. 4 is a flow diagram showing a method performed by the interrupt controller.

FIG. 4 is a flow diagram showing a method of interrupt control performed by the interrupt controller 10. At step 100, the interrupt detection circuitry 40 detects a given interrupt having a given interrupt identifier, as raised by an interrupt source 14 (the given interrupt identifier could be specified directly by the interrupt source or could be a translated identifier obtained by translating an identifier specified by the interrupt source). At step 102, in response to the detection of the given interrupt, the interrupt control circuitry 44 controls interrupt controller memory access circuitry 46 to signal the given interrupt to a target interrupt handling context (such as a given physical processor or virtual processor) by issuing one or more memory write requests to maintain a set of memory-based interrupts tracking structures, including a selected interrupt queue structure 70 used to queue the given interrupt for processing by the target interrupt handling context (the selected queue structure 70 can be selected from multiple queue structures 70 based on the given interrupt identifier—e.g. based on an indirect selection, where the interrupt identifier is used to select an interrupt status entry which provides a priority level, and the priority level is used to select the selected interrupt queue structure 70), and a queue status summary structure 62 which is updated to indicate which interrupt queue structures 70 hold pending interrupts awaiting processing by the target interrupt handling context. The write requests cause the coherency mechanism provided by the interconnect 6 to issue snoop requests or other coherency messages to any caches which could hold data for the same address that was updated, which can be used to prompt a given processor 4 which is monitoring that address for interrupts to cause software to service the interrupt.

Figure 5:
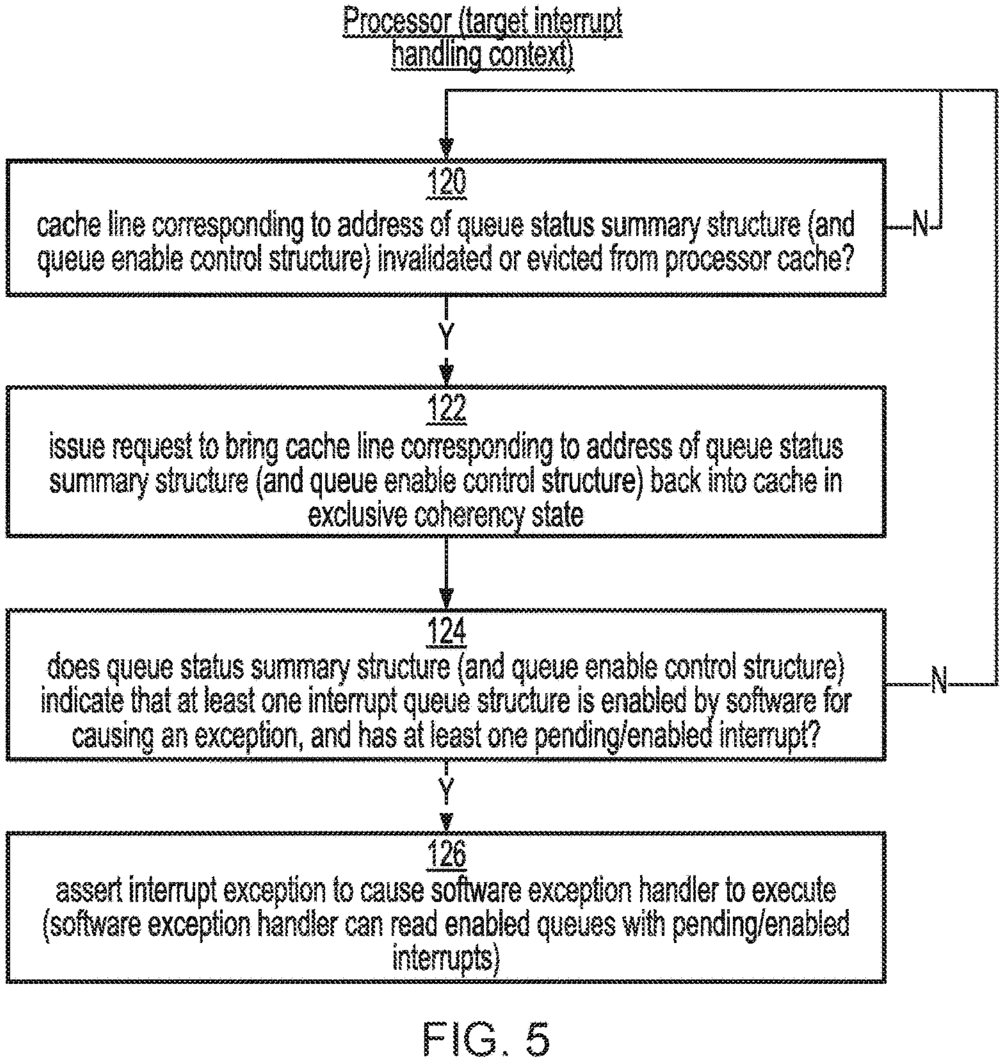
FIG. 5 is a flow diagram showing steps performed by a processor which is monitoring interrupts for a target interrupt handling context.

FIG. 5 illustrates steps performed by a given processor 4 acting on behalf of a target interrupt handling context for which the address of the corresponding queue status summary structure 62 is cached in the exclusive state in the processor's caches 22. At step 120 the interrupt monitoring control circuitry 28 of the processor 4 determines whether the cache line corresponding to the address of the queue status summary structure 62 has been invalidated or evicted from the processor's caches 22. If not, then the method continues to await invalidation or eviction of the relevant cache line. When the cache line is detected as being invalidated or evicted, at step 122 the interrupt monitoring control circuitry 28 issues a request to bring the cache line back into the cache in the exclusive coherency state. This ensures that the processor can continue to monitor that address to check for updates to the queue status summary structure which could indicate that a pending interrupt has been signalled by the interrupt controller 10 (since updates to the queue status summary structure by the interrupt controller would prompt the interconnect 6 to issue a snoop request prompting invalidation of the exclusively held address from the processor's cache 22). As the queue enable control structure 64 is in the same cache line as the queue status summary structure, the request for the address of the queue status summary structure also causes the queue enable control structure 64 to be made available to the processor.

Once the cache line corresponding to the queue status summary structure (and if supported, also the queue enabled summary structure) is available in the cache, the interrupt monitoring control circuitry 28 of the processor 4 checks, based on the queue status summary structure 62 and queue enable control structure 64, whether there is at least one queue that is both enabled by software for causing an exception to be signalled, and has a pending/enabled interrupt. This check can be efficiently performed by combining the summary structures 62, 64 using a bitwise AND, and checking whether there is any bit set to 1 in the AND result. If there is at least one queue 70 which is enabled and includes a pending/enabled interrupt, then at step 126 the interrupt monitoring control circuitry 28 asserts an interrupt exception signalled to cause processing on the processing circuitry 20 to be interrupted so that the processing circuitry 20 switches to processing of an exception handler in software. The exception handler then reads the queue structures 70 identified as being enabled and having at least one pending/enabled interrupt. The exception handler can read the queue structures 70 having a 1 in the AND result in order of priority level. Hence, by grouping the interrupts in queues arranged by priority level, this makes it particularly straightforward for the exception handler to determine which queues to read first, as this avoids any need to read information about individual priorities in order to ascertain interrupt priority. The exception handler can read the highest priority queue that has pending/enabled interrupts first, then process each pending/enabled interrupt in that queue in queue order without needing to prioritise between the interrupts in that queue (determining the enabled status for a pending interrupt based on checking the specific interrupt status entry 66 for that interrupt), before switching to another queue of lower priority when all the higher priority interrupts in the first queue have been serviced.

It will be appreciated that the operations performed by the exception handler in software are not features of the data processing apparatus 18 itself as there is no hardware processing logic implement in the steps. The software is not part of the apparatus 18 itself as it would be installed later when the apparatus is in use.

Figure 6:
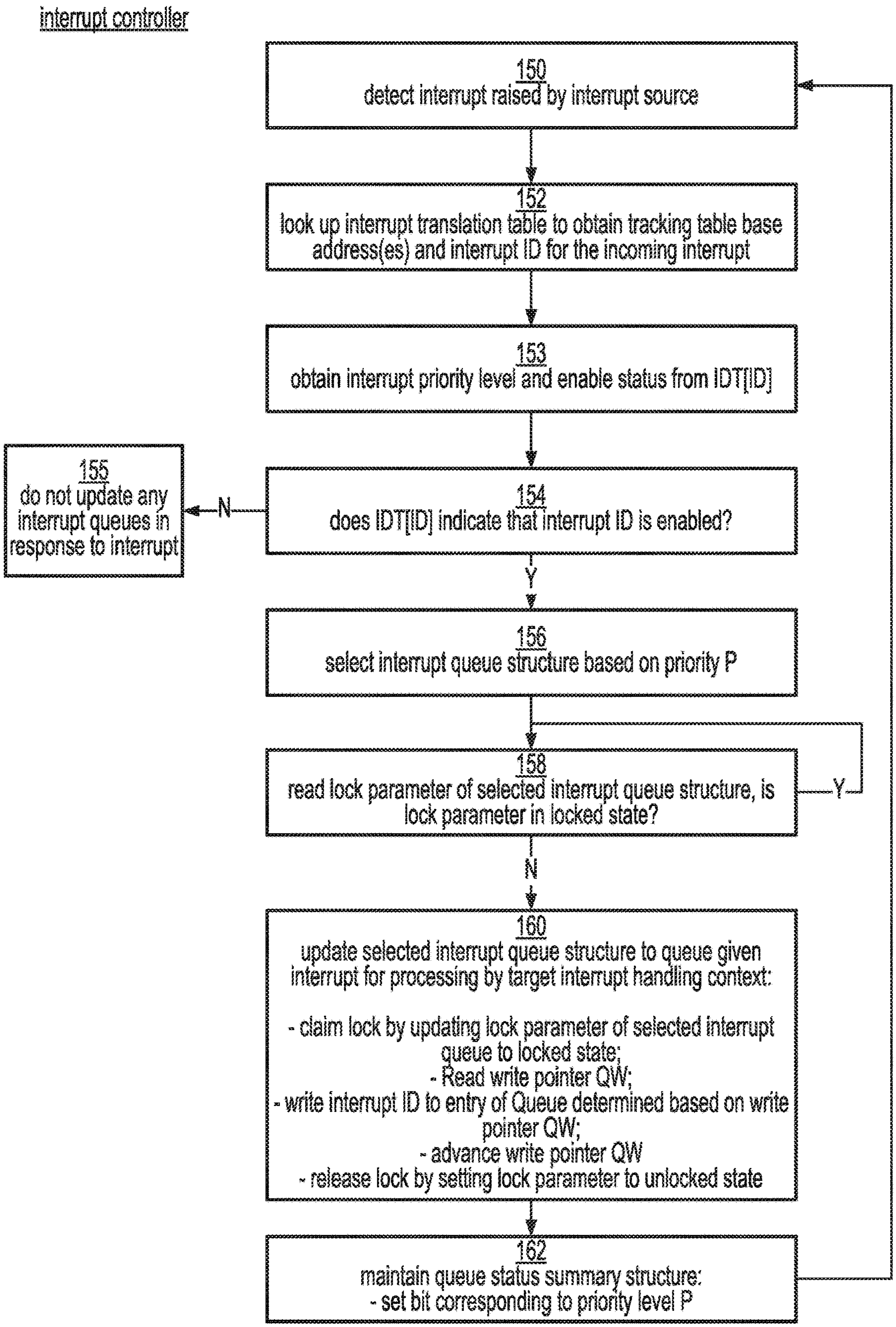
FIG. 6 is a flow diagram illustrating steps performed by the interrupt controller in more detail.

FIG. 6 is a flow diagram showing steps performed by the interrupt controller 10 in more detail for detecting and distributing interrupts. At step 150, the interrupt controller 10 detects the interrupt raised by the interrupt source (this step is the same as in step 100 of FIG. 4). In response to the detected interrupt, at step 152, the interrupt control circuitry 44 of the interrupt controller 10 looks up a data structure called an interrupt translation table (ITT) to obtain the interrupt identifier for the corresponding interrupt and the base addresses for the set of interrupt tracking structures to be used for that interrupt. For example, the ITT can be used to provide interrupt identifier translation so that different interrupt sources, which may have used conflicting interrupt identifiers, can have their interrupt identifiers mapped to a global interrupt identifier space used by the interrupt controller. The ITT can also be used to define which interrupt handling context is to service the interrupt. Hence, the interrupt controller 10 does not need to be aware of which particular physical or virtual processors are to be used for servicing the interrupt as the ITT can map the received (untranslated) interrupt identifier to specific addresses of the structures to be updated in memory and the interrupt controller 10 may not be aware of which particular processors 4 are currently monitoring those interrupt tracking structures for updates. Other examples may not support interrupt identifier translation and in that case the base addresses of the structures corresponding to a particular interrupts identifier can be defined in a different data structure. The ITT, or other data structure used to identify the base addresses of the interrupt tracking structures to be updated for the incoming interrupt, could be stored either in memory or in a set of dedicated storage (e.g. configuration registers 50) within the interrupt controller 10.

At step 153, the interrupt descriptor table 60 of the set of tracking structures identified based on the base addresses obtained at step 152 is accessed, and the interrupt controller 10 reads the interrupt status entry 66 corresponding to the interrupt identifier (the translated interrupt identifier, if interrupt identifier translation is supported) to identify the priority level P and enable status for the interrupt. At step 154, the interrupt controller 10 determines whether the enable status, obtained from the interrupt status entry 66 corresponding to the interrupt identifier, indicates that this interrupt identifier is currently enabled. If not, the interrupt is masked and so at step 155 the interrupt controller 10 does not update any of the interrupt queues 70 in response to the interrupt detected at step 150. If the interrupt is determined to be enabled, then at step 156, the interrupt control circuitry 44 of the interrupt controller 10 selects the base address of the queue structure 70 which corresponds to the priority level P obtained for the interrupt. At step 158, the lock parameter 74 is read for the selected interrupt queue structure 70, and the interrupt control circuitry 44 determines whether the lock parameter is currently in the locked state. If the queue is currently locked, then the interrupt control circuitry 44 waits until the lock parameter is no longer in the locked state. Once the lock parameter 74 indicates the unlocked state, then at step 160 the interrupt control circuitry 44 controls the interrupt controller memory access circuitry 46 to issue write requests for updating the selected interrupt queue structure to queue the given interrupt received at step 150 for processing by the target interrupt handling context. This is done by performing a series of memory accesses to:

- claim the lock, by updating the lock parameter QL 74 of the selected queue 72 the locked state (in some examples, the checking of the lock at step 158 and the setting of the lock at step 160 can be implemented using a single atomic test-and-set request which atomically sets the lock on condition that it was not already set by another requester);
- read the write pointer QW 82;
- write the (translated) interrupt identifier of the detected interrupt to the next available entry of the queue (the next available entry is determined based on the write pointer QW 82).
- update the write pointer QW to advance it to point to the next entry after the entry previously indicated by the write pointer QW; and
- release the lock by setting the lock parameter QL to the unlocked state, allowing access by other requesters such as software on a processor 4.

At step 162, the interrupt control circuitry 44 controls the interrupt controller memory access circuitry 46 to issue a write request to maintain the queue status summary structure 62 by setting the bit corresponding to the priority level P obtained at step 153. The method then returns to step 150 to process the next interrupt detected by the interrupt controller 10.

Figure 7:
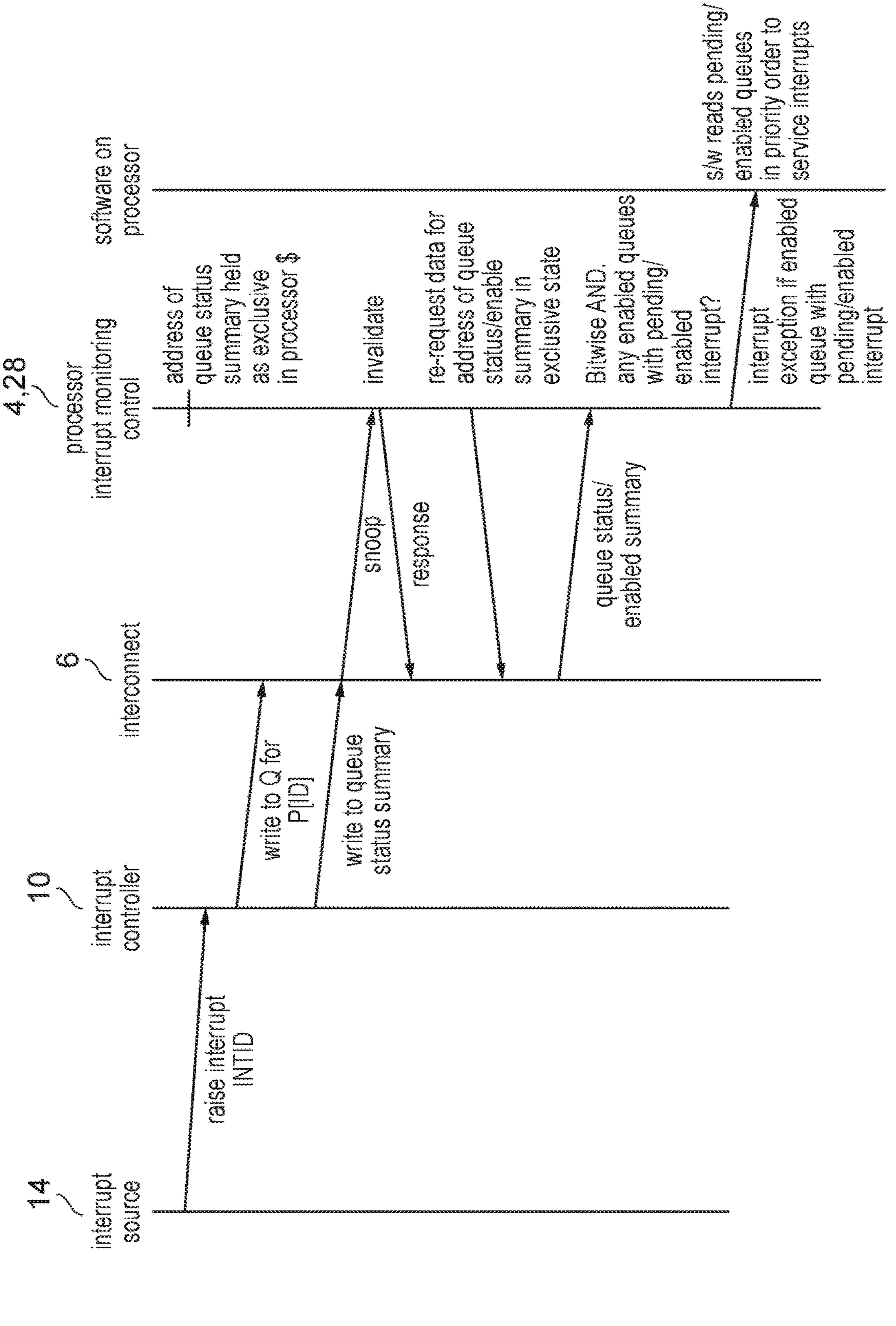
FIG. 7 is a ladder diagram showing forwarding of an interrupt by the interrupt controller.

FIG. 7 is a ladder diagram showing an example interaction between an interrupt source 14, the interrupt controller 10, the interconnect 6, a processor 4 and the software executing on the processor. The interrupt source 14 issues a signal to the interrupt controller 10 indicating that an interrupt for a certain interrupt identifier has been raised. This prompts the interrupt controller 10 to write an indication of the raised interrupt to the queue structure 70 corresponding to the priority level P specified in the interrupt status entry 66 for the corresponding interrupt identifier (in the example of FIG. 7, interrupt identifier translation is omitted for conciseness, but could still be supported in other examples). The interrupt controller 10 also writes to the queue status summary structure 62 for the corresponding interrupt handling context, to indicate that a pending interrupt has been set in the queue. The write to the queue status summary 62 triggers the interrupt 6 to snoop caches 22 of any processors 4 which could hold the data for the corresponding address (the snoop filter 32 could be used to limit how many snoops are required, if it is known that certain caches do not hold the corresponding address). Note that such snoops could also be triggered by the write to the queue structure 70 itself, but these snoops are omitted from FIG. 7 for conciseness.

The snoop request issued by the interconnect 6 is detected at the processor 4 which invalidates from its cache 22 the data having the address corresponding to the queue status summary structure 62, which was previously held as exclusive in the processor's cache 22. The processor 4 returns a snoop response indicating that the cache data for the snoop address has been invalidated, which can be detected at the interconnect 6 as part of the coherency protocol (which may require a response from each snooped requester). The interrupt monitoring control circuitry 28 at the processor 4 detects that the cache line for the address of the queue status summary 62 has been invalidated and so re-requests the data for that address to be obtained from the memory system, requesting that the data is held as exclusive in the cache (this read request may itself cause snoops to the interrupt controller 10 or other processors 4, but these snoops are omitted from FIG. 7 for conciseness). The read request causes the up to date values of the queue status and enable bitmaps 62, 64 to be returned to the processor 4, where the interrupt monitoring control circuitry 28 can combine the queue status/enable bitmaps 62, 64 (e.g. as a bitwise AND as discussed above), to produce a value indicating which queues both contain at least one pending/enabled interrupt and are indicated by the queue enable bitmap 64 as being enabled by software for causing an exception to be raised. If there are any queues which both have at least one pending/enabled interrupt and are enabled for causing an exception to be signalled, then the interrupt monitoring control circuitry 28 raises an interrupt exception sent to the processing circuitry 20 which causes the software executing on the processor to be interrupted. The processing circuitry 20 switches to executing a software exception handler, which reads the queue structures 70 identified as enabled and having a pending/enabled interrupt, to identify which interrupts require servicing.

In the example of FIG. 7, the snoop generated by the interconnect 6 in response to the write the queue status summary structure by the interrupt controller 10 causes invalidation of the cached data for the queue status summary 62 at the processor's cache 4, and the interrupt monitoring control circuitry 28 at the processor 4 then requests that the updated data for that addresses then brought back into its cache so that the processor 4 can check which queues have been updated with pending interrupts.

Figure 8:
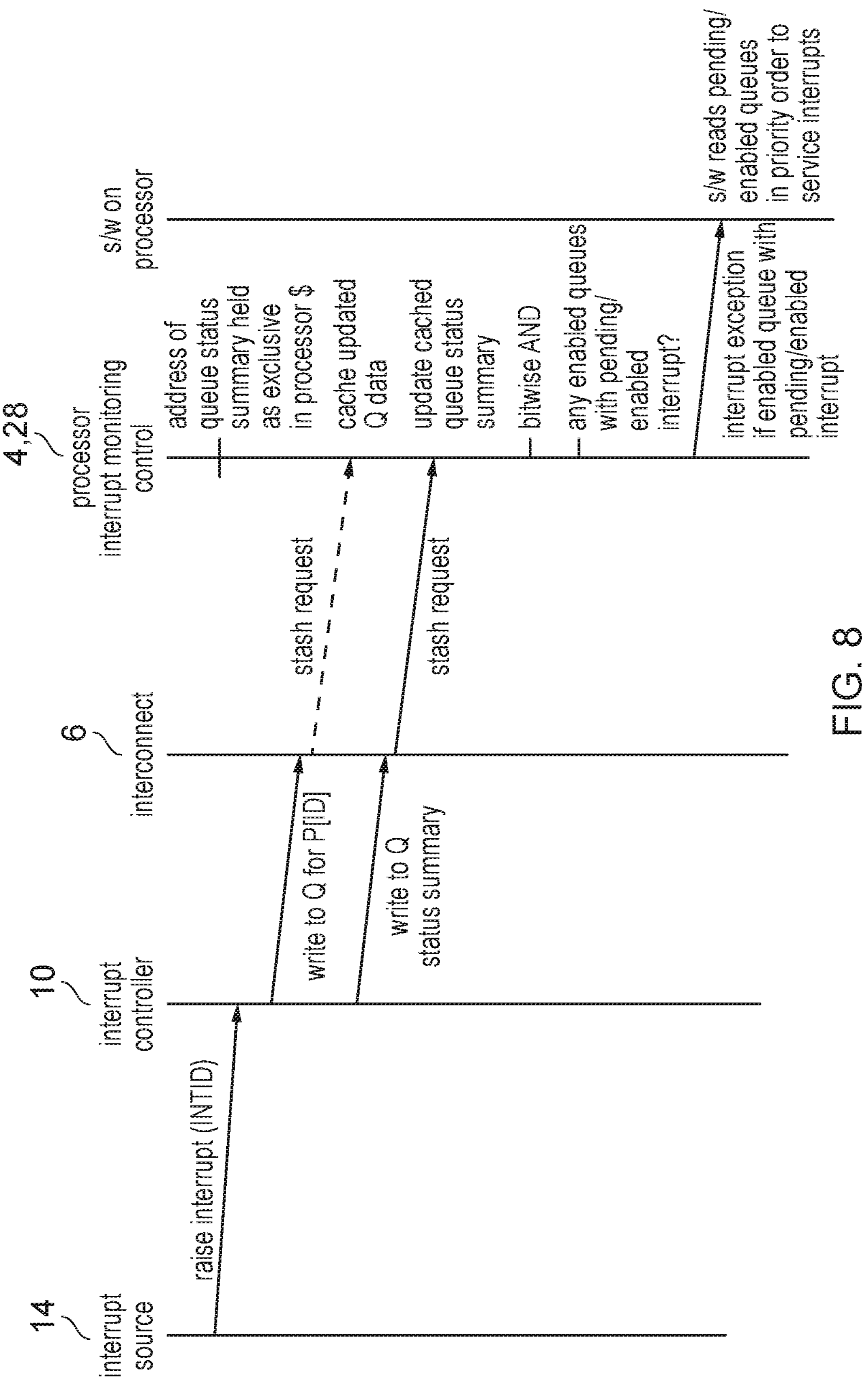
FIG. 8 is a ladder diagram showing use of a cache stashing request to push updated interrupt tracking structure data to a processor's cache.

However, as shown in FIG. 8, in some implementations the delay associated with the read request for the queue status summary 62 can be eliminated by using a cache stashing request, which some coherency protocols may support to allow a requester to request that updated data for a given address is directly pushed to the cache of another requester. The raising of the interrupt by the interrupts source 14 is the same in FIG. 8 as in FIG. 7, but this time instead of the interrupt controller 10 issuing a non-stashing write which causes a snoop to the processor 4, the interrupt controller issues a cache stashing write request which causes the updated data value for the queue status summary 62 to be pushed to the processor's cache 22 (with the updated data held in the processor's cache 22 as exclusive). While FIG. 8 shows a stash request sent via the interconnect 6, it could also be sent directly by the interrupt controller 10 to the processor 4. The stashing request eliminates the need for the processor 4 to issue a read request to the interconnect 6 to request access to the queue status summary 62. Hence, a push mechanism is used instead of a pull mechanism triggered by an explicit processor request as in FIG. 7. The subsequent operations using the queue status summary 62 and the queue enable control structure 64, the signalling of the interrupt exception to the software, and the software's reads to the queue structures 70 are the same in FIG. 8 as in FIG. 7.

Hence, by using stashing requests to update the addresses in the relevant interrupt handling tracking structures, the interrupt controller 10 and interconnect 6 can speed up interrupt servicing at the processor 4 by eliminating the delay associated with reading back into the processor's cache the data for the previously invalidated cache line corresponding to the queue status summary structure 62.

As mentioned above, the interrupt distributing technique discussed above can be used for distributing virtual interrupts to be processed by a virtual processor running on a physical processor 4. A hypervisor running on the physical processor 4 is responsible for scheduling which particular virtual processor is running at a given time. When a given virtual processor becomes resident on the physical processor 4, the hypervisor can program the addresses to be monitored by the interrupt monitoring control circuitry 28, to indicate the address of the resident virtual processor's queue status summary structure 62 as one of the addresses to be monitored. This allows the interrupt controller hardware to directly inject interrupts to the resident virtual processor (rather than relying on software to emulate signalling of the interrupt to the virtual processor).

However, a problem in systems which supports direct injection of interrupts to virtual processors is what to do when the target virtual processor of an interrupt is not currently resident. For example, when a virtual processor has no more work to do, it may issue an instruction to cause a trap to the hypervisor. The hypervisor software can use this as a hint that the virtual processor has no work to perform and puts the virtual processor on a scheduling sleep queue, waiting for some event to put the virtual processor back on a queue of virtual processors to run. In the meantime another virtual processor with work to do can execute on the physical processor. This helps to improve throughput in a system, or to preserve power by being able to put the physical processor in a low power state when no virtual processors have work to do.

When a virtual interrupt arrives for a non-resident virtual processor on a sleep queue (as indicated by the interrupt controller 10 updating the queue status summary structure 62 for that virtual processor's interrupt handling context) the hypervisor interprets that as a hint that the virtual processor now has work to do, and will typically either run the virtual processor immediately or put it on a run queue to be scheduled shortly. This scheme works well when virtual interrupts are generated in software, because the hypervisor is directly involved in this process and can perform the above actions when needed. However, when using hardware acceleration to support direct injection of interrupts generated by hardware as virtual interrupts to a virtual processor, such as the direct injection functionality described above, then virtual interrupts may be pending for a sleeping virtual processor, and the hypervisor does not know to wake up the virtual processor.

This problem can be solved by, when a virtual processor is not resident on any physical processor, and a virtual interrupt arrives for the virtual processor, the interrupt controller generates a physical notification interrupt (referred to as a doorbell interrupt) to the hypervisor, informing the hypervisor to wake up and run the virtual processor such that it can process the virtual interrupt. However, for the interrupt controller 10 of the type discussed above which delivers interrupts simply by writing to shared memory (with the action of updating a specific memory location causing the processor to raise an interrupt), generating the physical doorbell interrupt at the interrupt controller 10 may not be practical because the interrupt controller 10 does not have awareness of the state of the target physical or virtual processors, but simply performs writes to memory.

Another way of generating the doorbell interrupts could be that the processor 4 monitors all the sets of interrupts tracking structures for the interrupt handling contexts corresponding to all the virtual processors (including both resident and non-resident virtual processors), so that when the interrupt controller 10 adds a pending interrupt to a queue 74 one of the non-resident virtual processors, this can be detected based on the coherency snoops to the corresponding address which triggers the interrupt monitoring control circuitry 28 to generate the physical doorbell interrupt sent to the processing circuitry 20 which prompts the hypervisor to reschedule which virtual processor is running. However, a problem with this approach is that there could be hundreds or thousands of virtual processors non-resident at a given time, and so monitoring each of the addresses corresponding to the queue status summaries 62 for each virtual processor would require a large number of entries of the processor caches 22 to be reserved for addresses of the queue status summaries 62, preventing them from being used for caching useful data actually being processed by the software running on the processing circuitry 20. In practice, this will impact on processing performance achieved by that software.

Figure 9:
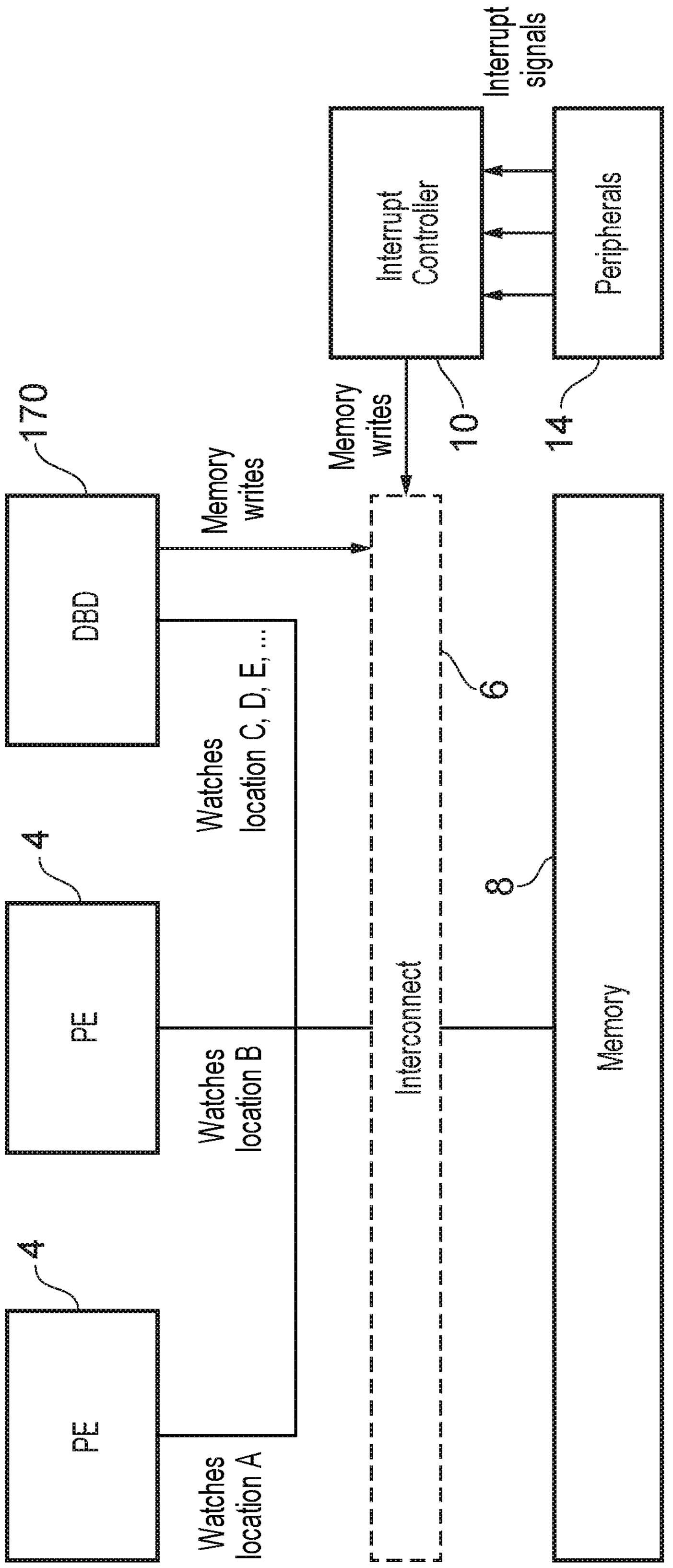
FIG. 9 illustrates an example of a system having a doorbell interrupt generating unit.

Hence, as shown in FIG. 9, a doorbell device (DBD) 170 (also referred to as doorbell interrupt generating unit) is provided which can receive interrupts in a similar manner as the processors 4 discussed earlier. The DBD 170 can monitor the memory locations used to signal pending interrupts for a number of virtual processors and if a pending interrupt is detected for any of those virtual processors, the DBD 170 can write to one or more memory locations specified by the hypervisor on a physical processor 4 (e.g. the addresses of the queue status summary 62 and queue 70 for the interrupt handling context corresponding to that physical processor 4), and thereby generate a doorbell interrupt to the hypervisor. In the example of FIG. 9, the processors 4, interconnect 6, interrupt controller 10, peripherals 14 and memory 8 are otherwise the same as in FIG. 2. Hence, by providing the DBD 170, the physical processors 4 themselves do not need to monitor the addresses used to signal interrupts for each virtual processor. Instead, it can be sufficient for each physical processor 4 to monitor one address corresponding to the queue status summary 62 of the interrupt handling context corresponding to that physical processor and one address corresponding to the queue status summary 62 of the interrupt handling context corresponding to a resident virtual processor currently being processed (optionally, additional interrupt handling contexts could also be monitored, such as interrupt handling contexts for specific security states of the processor 4). The hypervisor can reprogram which addresses are to be monitored by the processor 4 for a virtual interrupt handling context each time it reschedule switch virtual processor is resident. The hypervisor can also program configuration information in the DBD 170 to control which addresses are monitored by the DBD 170 and which addresses the DBD writes to when a physical interrupt is signalled following detection of a pending virtual interrupt.

Figure 10:
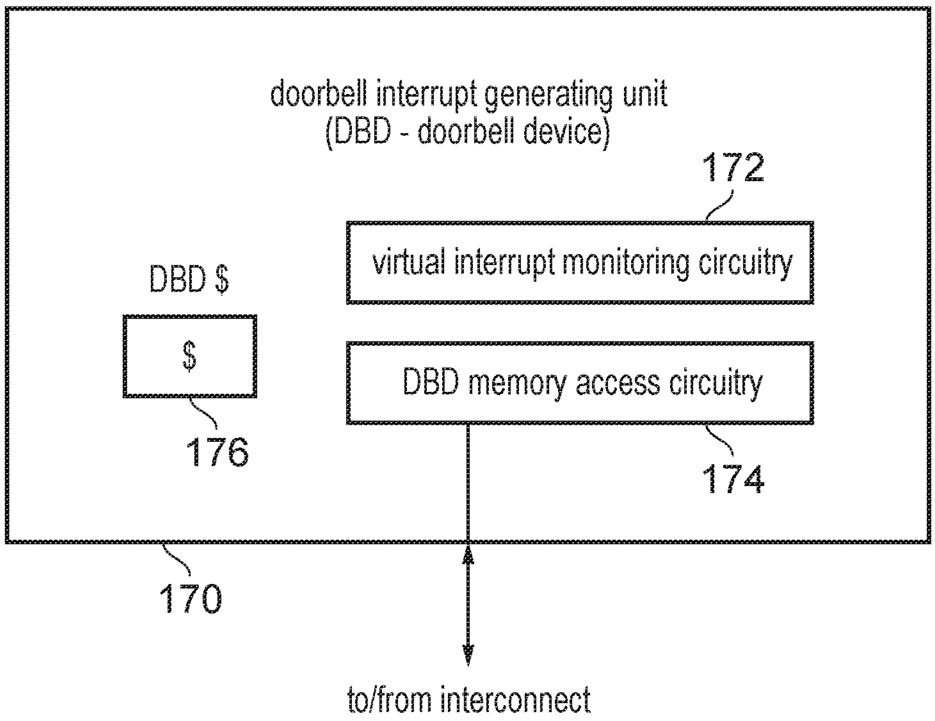
FIG. 10 illustrates components of the doorbell interrupt generating unit in more detail.

FIG. 10 illustrates the DBD 170 in more detail. In a similar way to the processor 4, the DBD 170 includes virtual interrupt monitoring circuitry 172, DBD memory access circuitry 174 and a cache 176 which function in a similar way to the corresponding components 28, 26, 22 of the processor 4, so that cache lines corresponding to the addresses of the virtual interrupts tracking structures to be monitored are repeatedly brought into the cache 176 in the exclusive coherency state so that any updates made by the interrupt controller 10 signalling pending virtual interrupts will cause invalidation of the cached data which can then prompt reads to read the updated data for that cache line. However, unlike the interrupt monitoring control circuitry 28 in the processor 4, when a virtual interrupt is detected, rather than signalling an interrupt exception to processing circuitry 20, the virtual interrupt monitoring circuitry 172 of the doorbell device 170 signals a physical interrupt by writing to the queue status summary 62 and one of the interrupt queues 70 of the set of interrupts tracking structures corresponding to the target physical processor which is to run the hypervisor to reschedule which virtual processor is running. The virtual interrupt monitoring circuitry 172 updates these tracking structures in the same way as the interrupt controller 10 as described earlier. In an alternative arrangement, rather than updating the tracking structure directly the DBD 170 could provide a signal to the interrupt controller 10 to request updating of the tracking structure. Programmable configuration information stored within the DBD 170 or within a memory-based data structure can be set by hypervisor software to indicate the mapping between the monitored address for a given virtual interrupt handling context, the physical interrupt number for the doorbell interrupt to be generated, and base addresses of the relevant tracking structures to be updated to signal the physical doorbell interrupt when an updated is detected for the monitored address for the given virtual interrupt handling context. Since the DBD 170 can identify the relevant addresses in memory to update based on this configuration information, the DBD 170 does not need to understand which physical processor is actually monitoring those addresses for updates and so does not need to specify a particular physical processor as the recipient of the physical doorbell interrupt.

Figure 11:
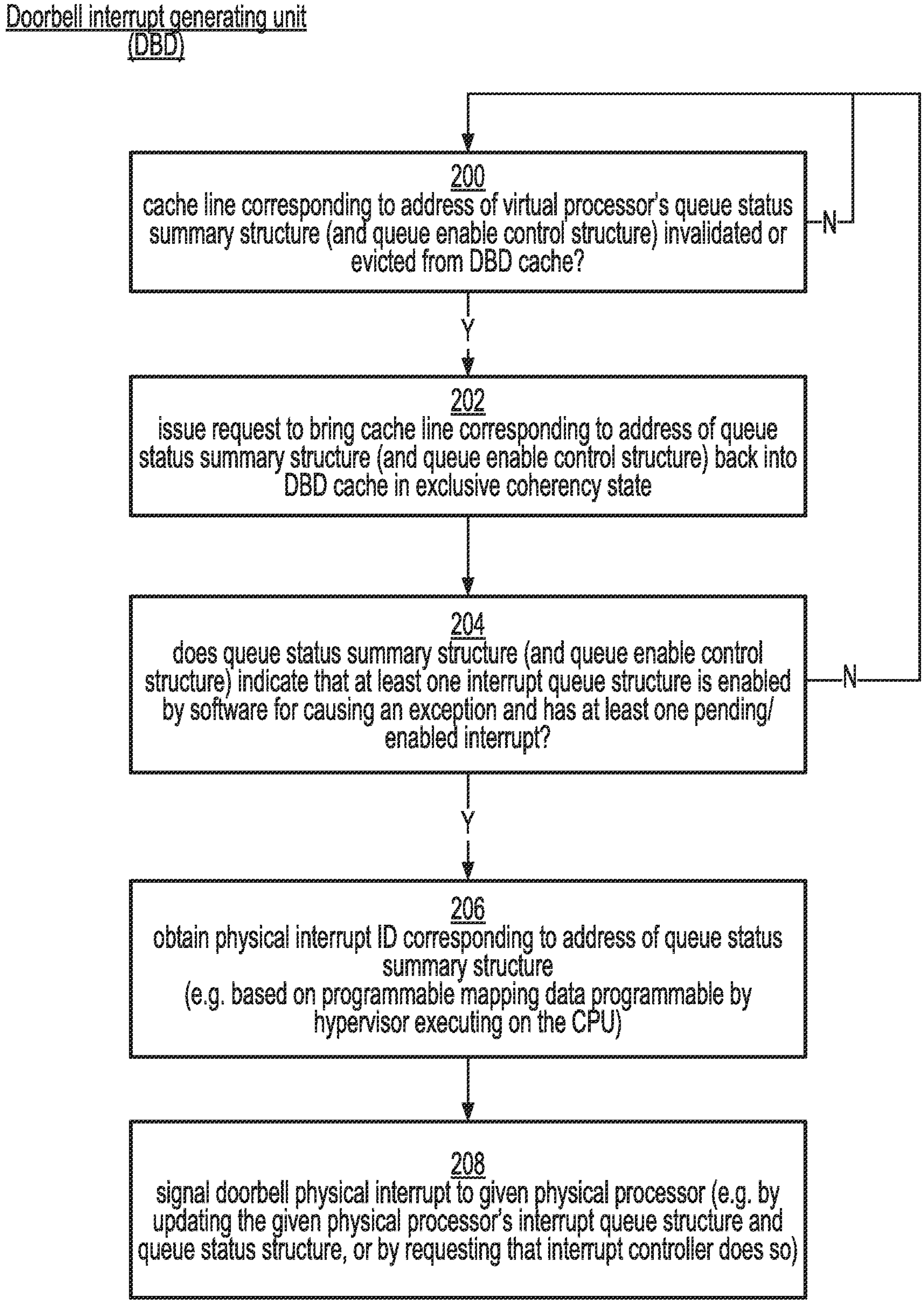
FIG. 11 is a flow diagram illustrating steps performed by the doorbell interrupt generating unit.

FIG. 11 is a flow diagram illustrating steps performed by the DBD 170. Steps 200, 202, 204 are the same as steps 120, 122, 124 performed by the processor, except performed in relation to the DBD's cache 176 instead of the processor's caches 22. Hence, at step 200 the virtual interrupt monitoring circuitry 172 of the DBD 170 detects whether a cache line corresponding to the address of a target virtual processor's queue status summary structure 62 (and, if supported, the queue enable control structure) has been invalidated or evicted from the DBD's cache 176. This invalidation/eviction could have been prompted either by an update to the queue status summary structure 62 by the interrupt controller 10 or an update to the queue enable control structure 64 by software executing on a processor 4.

If the cache line corresponding to the address of the queue status summary structure 62 is invalidated or evicted, then at step 202 a request is issued to bring the cache line corresponding to the address of the queue status summary structure (and queue enable control structure) back into the DBD cache 176 in an exclusive coherency state. Once the data is available in the DBD's cache 176 then at step 204 the virtual interrupt monitoring circuitry 172 determines whether there is any queue which is both (i) indicated by the queue status summary structure 62 as having at least one pending/enabled interrupt, and (ii) indicated by the queue enable control structure 64 as being enabled for causing exceptions to be signalled to software. As mentioned above, the DBD 170 does not actually know which virtual processor is the target virtual processor—the DBD 170 has simply been configured by the hypervisor to check a particular address for updates. Again, enabled queues 70 with pending/enabled interrupts are identified by combining the queue status/enable bitmaps 62, 64 (e.g. using a bitwise AND and checking for bits set to 1). If at least one queue 70 is indicated by the bitmaps 62, 64 as being enabled for causing exceptions and including at least one pending/enabled interrupt, then at step 206 the virtual interrupt monitoring circuitry obtains the physical interrupt identifier corresponding to the address of the queue status summary structure 62. For example, this can be obtained based on programmable mapping data programmable by the hypervisor executing on one of the physical processors 4. The mapping data may also specify a base address for a set of interrupt tracking structures corresponding to that physical processor's interrupt handling context. At step 208 the virtual interrupt monitoring circuitry 172 of the DBD 170 signals a doorbell physical interrupt to a given physical processor, by updating the given physical processor's interrupt queue structure 70 and queue status structure 62 to signal that an interrupt having the identified physical interrupt ID has become pending. Alternatively, the DBD 170 could request that the interrupt controller performs these updates.

Hence, with this approach, the responsibility for monitoring a large number of virtual processor's queue summary structures 62 can be passed to the DBD 170 which does not perform any real processing in software and so its cache 176 can be dedicated to cache lines allocated for monitoring interrupts, making it feasible to monitor a much larger number of addresses corresponding to different virtual processors' queue summary structures 62 than would be feasible for a virtual processor. This approach also means the system can be much more easily scalable to different numbers of virtual processors.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An interrupt controller comprising:

interrupt detection circuitry to detect interrupts raised by one or more interrupt sources;

interrupt controller memory access circuitry to issue memory access requests for accessing a shared memory system via a cache coherent interconnect; and interrupt control circuitry responsive to a given interrupt with a given interrupt identifier being detected by the interrupt detection circuitry, to control signalling of the given interrupt to a target interrupt handling context by controlling the interrupt controller memory access circuitry to issue one or more memory write requests, in accordance with a coherency protocol supported by the cache coherent interconnect, to maintain a set of memory-based interrupt tracking structures corresponding to the target interrupt handling context, the set of memory-based interrupt tracking structures including:

a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

2. The interrupt controller according to claim 1, in which the interrupt control circuitry is configured to control the interrupt controller memory access circuitry to issue memory write requests for maintaining a plurality of sets of the memory-based interrupt tracking data structures, each set corresponding to a respective interrupt handling context.

3. The interrupt controller according to claim 1, in which the plurality of interrupt queue structures correspond to a plurality of interrupt priority levels respectively; and in response to the given interrupt, the interrupt control circuitry is configured to determine a given priority level for the given interrupt based on the given interrupt identifier, and to select, as the selected interrupt queue structure, one of the plurality of interrupt queue structures corresponding to the given priority level.

4. The interrupt controller according to claim 3, in which the set of memory-based interrupt tracking data structures comprises a plurality of interrupt status entries each corresponding to a respective interrupt identifier and specifying an interrupt priority level associated with that interrupt identifier.

5. The interrupt controller according to claim 1, in which the set of memory-based interrupt tracking data structures comprises a plurality of interrupt status entries each corresponding to a respective interrupt identifier and specifying whether interrupts of that interrupt identifier are currently enabled.

6. The interrupt controller according to claim 1, in which the queue status summary structure has a size which fits within a single cache line.

7. The interrupt controller according to claim 1, each interrupt queue structure has a size which fits within a single page of address space.

8. The interrupt controller according to claim 1, in which an interrupt descriptor structure, comprising the queue status summary structure and a plurality of interrupt status entries, has a size which fits within a single page of address space, the plurality of interrupt status entries each corresponding to a respective interrupt identifier, and indicating at least one of: an interrupt priority level and an enable status associated with that interrupt identifier.

9. The interrupt controller according to claim 1, in which a given interrupt queue structure comprises a queue descriptor specifying at least one of:

a queue size parameter indicative of a maximum queue size for the given interrupt queue structure;

a write pointer indicative of a next queue entry to be updated by the interrupt controller; and a read pointer indicative of a next queue entry to be read for the target interrupt handling context.

10. The interrupt controller according to claim 1, in which a given interrupt queue structure comprises a lock parameter to indicate whether the given interrupt queue structure is locked for exclusive access; and in response to the given interrupt, when the lock parameter for the selected interrupt queue structure indicates that the selected interrupt queue structure is locked for exclusive access, the interrupt control circuitry is configured to defer updating the selected interrupt queue structure until the lock parameter indicates that the selected interrupt queue structure is no longer locked for exclusive access.

11. The interrupt controller according to claim 1, in which in response to the given interrupt, the interrupt control circuitry is configured to control the interrupt controller memory access circuitry to maintain at least one cache line of the set of memory-based interrupt tracking data structures by issuing a cache stashing request to push an updated value for the at least one cache line to a cache associated with a processor handling interrupts for the target interrupt handling context.

12. An apparatus comprising:

the interrupt controller according to any preceding claim;

the cache coherent interconnect; and at least one physical processor, a given physical processor comprising:

processing circuitry to perform data processing in response to instructions; at least one processor cache; and processor memory access circuitry to issue memory access requests for accessing the shared memory system via the cache coherent interconnect.

13. The apparatus according to claim 12, in which the given physical processor comprises interrupt monitoring control circuitry to repeatedly control the processor memory access circuitry to issue an interrupt monitoring memory access request requesting that a given cache line designated for storing the queue status summary structure is brought into the at least one cache in an exclusive coherency state of the coherency protocol.

14. The apparatus according to claim 13, in which the interrupt monitoring control circuitry is configured to control the processor memory access circuitry to issue the interrupt monitoring memory access requests for a plurality of cache lines comprising:

at least one cache line designated for storing the queue status summary structure of the set of memory-based interrupt tracking data structures corresponding to the given physical processor; and when a given virtual processor is currently resident on the given physical processor, at least one cache line designated for storing the queue status summary structure of the set of memory-based interrupt tracking data structures corresponding to the given virtual processor.

15. The apparatus according to claim 13, in which the cache coherent interconnect is configured to apply a quality of service mechanism for regulating access to a shared resource in response to requests from the at least one physical processor and the interrupt controller, to prevent the interrupt controller being starved of access to the given cache line due to repeated requests from the at least one physical processor for the given cache line.

16. The apparatus according to claim 12, in which:

the set of memory-based interrupt tracking data structures also comprises a queue enable control structure to indicate which of the plurality of interrupt queue structures are disabled from causing an exception to be signalled to the processing circuitry.

17. The apparatus according to claim 12, in which:

the interrupt control circuitry of the interrupt controller is configured to control the memory access circuitry to issue memory write requests for maintaining a plurality of sets of the memory-based interrupt tracking data structure corresponding to respective virtual processors; and the apparatus comprises a doorbell interrupt generating unit, separate from the at least one physical processor and the interrupt controller, comprising:

at least one doorbell interrupt generating unit cache;

doorbell interrupt generating unit memory access circuitry to issue memory access requests for accessing the shared memory system via the cache coherent interconnect; and virtual interrupt monitoring circuitry to monitor coherency traffic sent to the at least one doorbell interrupt generating unit cache to detect signalling of a given virtual interrupt based on the interrupt controller updating the queue status summary structure of the set of memory-based interrupt tracking data structures for a given virtual processor, and in response to detecting signalling of the given virtual interrupt, to signal a doorbell physical interrupt to a given physical processor.

18. The apparatus according to claim 17, in which the virtual interrupt monitoring circuitry is configured to monitor updates to the queue status summary structure for a greater number of sets of memory-based interrupt tracking data structures than are monitored by interrupt monitoring control circuitry of the given physical processor.

19. An interrupt control method comprising:

detecting interrupts raised by one or more interrupt sources; and in response to a given interrupt of a given interrupt identifier being detected, controlling signalling of the given interrupt to a target interrupt handling context, by controlling issuing of one or more memory write requests via a cache coherency interconnect in accordance with a coherency protocol, to maintain a set of memory-based interrupt tracking structures corresponding to the target interrupt handling context, the set of memory-based interrupt tracking structures including:

a selected interrupt queue structure selected from among a plurality of interrupt queue structures based on the given interrupt identifier, to queue the given interrupt for processing by the target interrupt handling context; and a queue status summary structure to indicate which of the plurality of interrupt queue structures hold pending interrupts awaiting processing by the target interrupt handling context.

20. A non-transitory computer-readable medium to store computer-readable code for fabrication of an interrupt controller according to claim 1.

* * * * *